US008617754B2

(12) United States Patent
Edmiston et al.

(10) Patent No.: US 8,617,754 B2
(45) Date of Patent: Dec. 31, 2013

(54) SYSTEMS AND METHODS FOR INDEPENDENTLY CONTROLLING THE OPERATION OF FUEL CELL STACKS AND FUEL CELL SYSTEMS INCORPORATING THE SAME

(75) Inventors: Thane Rea Edmiston, Bend, OR (US); Benjamin Charles Greenough, Bend, OR (US)

(73) Assignee: DCNS SA, La Montagne (FR)

( * ) Notice: Subject to any disclaimer, the term of this patent is extended or adjusted under 35 U.S.C. 154(b) by 29 days.

(21) Appl. No.: 13/316,245

(22) Filed: Dec. 9, 2011

(65) Prior Publication Data
US 2012/0088171 A1    Apr. 12, 2012

Related U.S. Application Data

(63) Continuation of application No. PCT/US2010/038387, filed on Jun. 11, 2010.

(60) Provisional application No. 61/186,732, filed on Jun. 12, 2009.

(51) Int. Cl.
*H01M 8/04* (2006.01)

(52) U.S. Cl.
USPC .......................................... 429/429; 429/428

(58) Field of Classification Search
USPC ................................. 429/429, 428
See application file for complete search history.

(56) References Cited

U.S. PATENT DOCUMENTS

| | | | |
|---|---|---|---|
| 2,824,620 A | 2/1958 | De Rosset | |
| 3,336,730 A | 8/1967 | McBride et al. | |
| 3,338,681 A | 8/1967 | Kordesch | |
| 3,350,176 A | 10/1967 | Green et al. | |
| 3,432,356 A | 3/1969 | Christianson | |

(Continued)

FOREIGN PATENT DOCUMENTS

| CA | 2317452 | 8/1999 |
|---|---|---|
| CA | 2276205 | 10/2002 |

(Continued)

OTHER PUBLICATIONS

English-language abstract of Japanese Patent No. 63-236269, 1999.

(Continued)

*Primary Examiner* — Milton I Cano
*Assistant Examiner* — Brent Thomas
(74) *Attorney, Agent, or Firm* — Dascenzo Intellectual Property Law, P.C.

(57) ABSTRACT

The present disclosure is directed to systems and methods for independently controlling the operation of fuel cell stacks and to fuel cell systems incorporating the same. These systems and methods may include providing a fuel cell system including a plurality of fuel cell stacks and at least a first energy storage device and controlling the operation of the plurality of fuel cell stacks based at least in part on a variable associated with the fuel cell system and/or an energy consuming device. These systems and methods may further include beginning production of electrical output from the fuel cell system responsive to a start condition, initiating production of electrical output from the plurality of fuel cell stacks responsive to a plurality of stack start conditions, and ceasing the production of electrical output from the fuel cell stacks responsive to at least a first stack stop condition.

16 Claims, 5 Drawing Sheets

(56) References Cited

U.S. PATENT DOCUMENTS

| | | | |
|---|---|---|---|
| 3,443,115 A | 5/1969 | Timmerman, Jr. |
| 3,469,944 A | 9/1969 | Bocard et al. |
| 3,522,019 A | 7/1970 | Buswell et al. |
| 3,580,741 A | 5/1971 | Hovious et al. |
| 3,655,448 A | 4/1972 | Setzer |
| 3,823,358 A | 7/1974 | Rey |
| 3,857,735 A | 12/1974 | Louis et al. |
| 4,000,003 A | 12/1976 | Baker et al. |
| 4,098,959 A | 7/1978 | Fanciullo |
| 4,098,960 A | 7/1978 | Gagnon |
| 4,175,165 A | 11/1979 | Adlhart |
| 4,214,969 A | 7/1980 | Lawrance |
| 4,310,605 A | 1/1982 | Early et al. |
| 4,342,816 A | 8/1982 | Kothmann et al. |
| 4,349,613 A | 9/1982 | Winsel |
| 4,351,405 A | 9/1982 | Fields et al. |
| 4,377,445 A | 3/1983 | Grimes |
| 4,390,602 A | 6/1983 | Struthers |
| 4,411,967 A | 10/1983 | Yano |
| 4,468,235 A | 8/1984 | Hill |
| 4,642,273 A | 2/1987 | Sasaki |
| 4,820,594 A | 4/1989 | Sugita et al. |
| 4,839,574 A | 6/1989 | Takabayashi |
| 4,883,724 A | 11/1989 | Yamamoto |
| 4,904,548 A | 2/1990 | Tajima |
| 4,988,283 A | 1/1991 | Nagasawa et al. |
| 5,006,846 A | 4/1991 | Granville et al. |
| 5,139,894 A | 8/1992 | Mizuno et al. |
| 5,141,824 A | 8/1992 | Hirota |
| 5,154,986 A | 10/1992 | Takechi et al. |
| 5,204,610 A | 4/1993 | Pierson et al. |
| 5,229,222 A | 7/1993 | Tsutsumi et al. |
| 5,334,463 A | 8/1994 | Tajima et al. |
| 5,366,818 A | 11/1994 | Wilkinson et al. |
| 5,366,821 A | 11/1994 | Merritt et al. |
| 5,401,589 A | 3/1995 | Palmer et al. |
| 5,432,710 A | 7/1995 | Ishimaru et al. |
| 5,462,815 A | 10/1995 | Horiuchi |
| 5,532,072 A | 7/1996 | Spaeh et al. |
| 5,624,768 A | 4/1997 | Tanokura |
| 5,631,532 A | 5/1997 | Azuma et al. |
| 5,637,414 A | 6/1997 | Inoue et al. |
| 5,658,681 A | 8/1997 | Sato et al. |
| 5,677,073 A | 10/1997 | Kawatsu |
| 5,709,961 A | 1/1998 | Cisar et al. |
| 5,712,052 A | 1/1998 | Kawatsu |
| 5,714,276 A | 2/1998 | Okamoto |
| 5,763,113 A | 6/1998 | Meltser et al. |
| 5,771,476 A | 6/1998 | Mufford et al. |
| 5,795,666 A | 8/1998 | Johnssen |
| 5,798,186 A | 8/1998 | Fletcher et al. |
| 5,861,137 A | 1/1999 | Edlund |
| 5,880,677 A | 3/1999 | Lestician |
| 5,897,766 A | 4/1999 | Kawatsu |
| 5,927,416 A | 7/1999 | de Re et al. |
| 5,929,538 A | 7/1999 | O'Sullivan et al. |
| 5,964,309 A | 10/1999 | Kimura et al. |
| 5,985,474 A | 11/1999 | Chen et al. |
| 5,989,739 A | 11/1999 | Zur Megede et al. |
| 5,991,670 A | 11/1999 | Mufford et al. |
| 5,997,594 A | 12/1999 | Edlund et al. |
| 5,998,053 A | 12/1999 | Diethelm |
| 6,013,385 A | 1/2000 | DuBose |
| 6,045,772 A | 4/2000 | Szydlowski et al. |
| 6,045,933 A | 4/2000 | Okamoto |
| 6,083,637 A | 7/2000 | Walz et al. |
| 6,096,449 A | 8/2000 | Fuglevand et al. |
| 6,103,410 A | 8/2000 | Fuller et al. |
| 6,110,612 A | 8/2000 | Walsh |
| 6,165,633 A | 12/2000 | Negishi |
| 6,214,484 B1 | 4/2001 | Hauer |
| 6,221,117 B1 | 4/2001 | Edlund et al. |
| 6,376,113 B1 | 4/2002 | Edlund et al. |
| 6,383,670 B1 | 5/2002 | Edlund et al. |
| 6,406,806 B1 * | 6/2002 | Keskula et al. ............ 429/432 |
| 6,421,593 B1 | 7/2002 | Kempen et al. |
| 6,423,203 B1 | 7/2002 | Faita et al. |
| 6,428,918 B1 | 8/2002 | Fuglevand et al. |
| 6,458,477 B1 | 10/2002 | Hsu |
| 6,494,937 B1 | 12/2002 | Edlund et al. |
| 6,495,277 B1 | 12/2002 | Edlund et al. |
| 6,503,649 B1 | 1/2003 | Czajkowski et al. |
| 6,522,955 B1 | 2/2003 | Colborn |
| 6,534,210 B2 | 3/2003 | Luken et al. |
| 6,537,690 B1 | 3/2003 | Karrupaiah et al. |
| 6,562,111 B2 | 5/2003 | Edlund et al. |
| 6,703,722 B2 | 3/2004 | Christensen |
| 6,764,782 B2 | 7/2004 | Raiser et al. |
| 6,764,785 B2 | 7/2004 | Colborn et al. |
| 6,835,481 B2 | 12/2004 | Dickman et al. |
| 6,844,100 B2 | 1/2005 | Bourgeois et al. |
| 6,858,335 B2 | 2/2005 | Schmidt et al. |
| 7,075,194 B2 | 7/2006 | Weidenheimer et al. |
| 7,087,327 B2 * | 8/2006 | Pearson ..................... 429/431 |
| 7,222,001 B2 | 5/2007 | Frost et al. |
| 7,247,398 B2 | 7/2007 | Logan et al. |
| 7,250,231 B2 * | 7/2007 | Edlund ..................... 429/429 |
| 7,261,962 B1 | 8/2007 | Czajkowski et al. |
| 7,318,971 B2 | 1/2008 | Imamura et al. |
| 7,390,587 B2 | 6/2008 | Dickman et al. |
| 7,419,734 B2 | 9/2008 | Pearson |
| 7,442,456 B2 | 10/2008 | Wheat et al. |
| 7,491,457 B2 | 2/2009 | Kearl et al. |
| 2002/0037443 A1 | 3/2002 | Christen et al. |
| 2003/0091882 A1 | 5/2003 | Schmidt et al. |
| 2004/0009380 A1 | 1/2004 | Pearson |
| 2004/0053082 A1 | 3/2004 | McCluskey et al. |
| 2004/0126635 A1 | 7/2004 | Pearson |
| 2005/0112428 A1 | 5/2005 | Freeman et al. |
| 2005/0119842 A1 | 6/2005 | Clingerman et al. |
| 2006/0172162 A1 | 8/2006 | Pearson |
| 2006/0194082 A1 * | 8/2006 | Tucker et al. ................ 429/9 |
| 2007/0042233 A1 | 2/2007 | Lyman et al. |
| 2007/0111058 A1 * | 5/2007 | Yoshida ..................... 429/22 |
| 2007/0184315 A1 | 8/2007 | Kelly et al. |
| 2008/0075988 A1 | 3/2008 | Suzuki et al. |
| 2008/0081236 A1 | 4/2008 | Kanashiki |

FOREIGN PATENT DOCUMENTS

| | | |
|---|---|---|
| DE | 10010985 | 9/2001 |
| EP | 1065741 A2 | 1/2001 |
| JP | SHO 53-81923 | 7/1978 |
| JP | SHO 57-111963 | 7/1982 |
| JP | SHO 62-17961 | 1/1987 |
| JP | SHO 63-276878 | 11/1988 |
| JP | HEI 02-214910 | 8/1990 |
| JP | HEI 09-117062 | 5/1997 |
| SH | SHO 62-24570 | 2/1987 |
| WO | WO 00/02282 | 1/2000 |
| WO | WO 01/73879 | 10/2001 |
| WO | WO 03/017405 | 2/2003 |
| WO | WO2008/057832 | 5/2008 |

OTHER PUBLICATIONS

English-language abstract of Japanese Patent No. 2-168803, 1999.
Nadal, et al., "Development of a Hybrid Fuel Cell/Battery Powered Electric Vehicle," *International Journal of Hydrogen Energy*, vol. 21, No. 6, pp. 497-505, Jun. 1, 1996.
English-language abstract of Japanese Unexamined Patent Application Publication No. SHO 62-17961, 1987.
English-language abstract of Japanese Unexamined Patent Application Publication No. SHO 62-24570, 1987.
English-language abstract of Japanese Unexamined Patent Application Publication No. SHO 63-276878, 1988.
English-language abstract of Japanese Patent No. 4-163860, 1992.
English-language abstract of Japanese Unexamined Patent Application Publication No. HEI 09-117062, 1997.
English-language abstract of Japanese Unexamined Patent Application Publication No. HEI 02-214910, 1998.

* cited by examiner

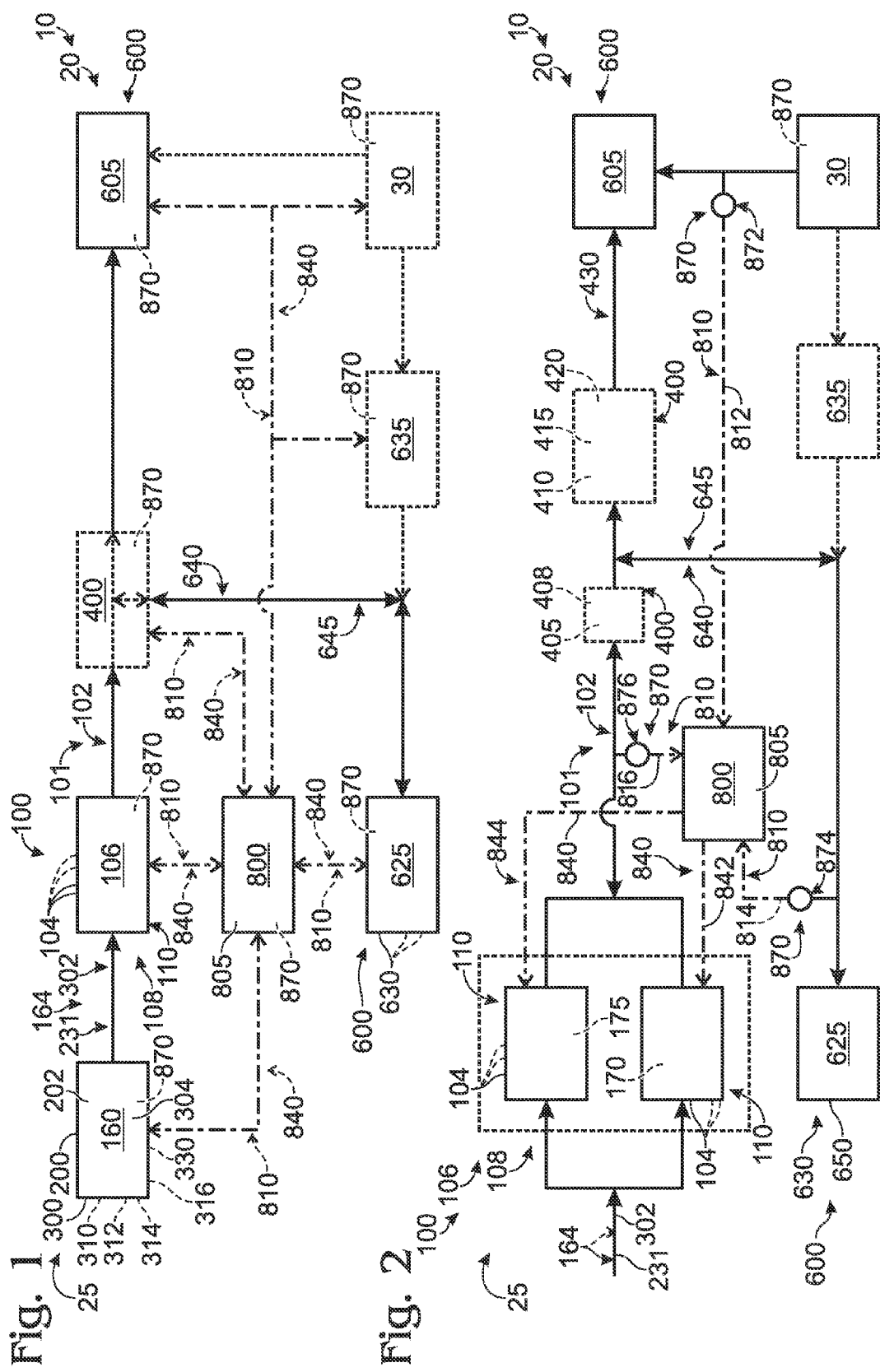

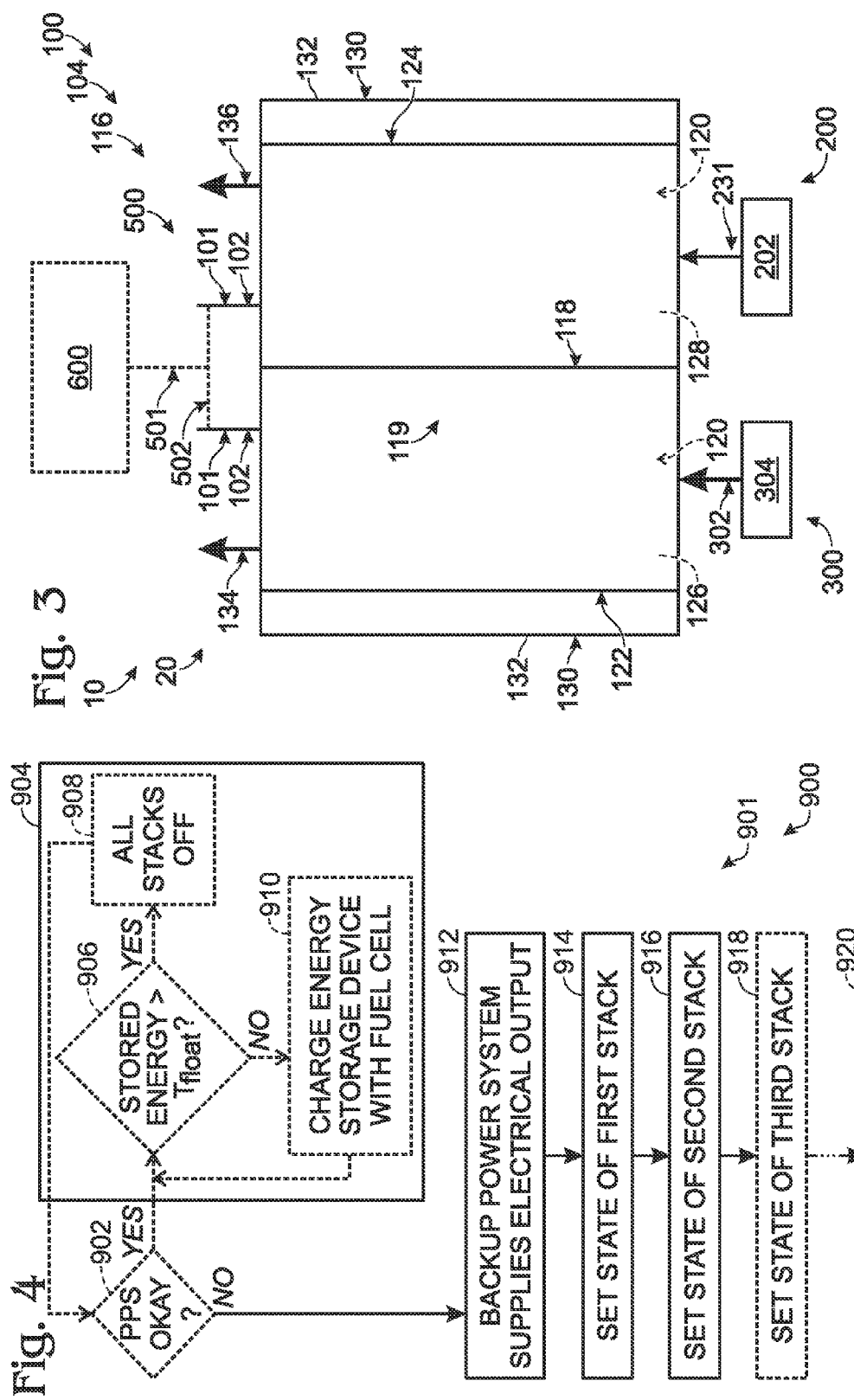

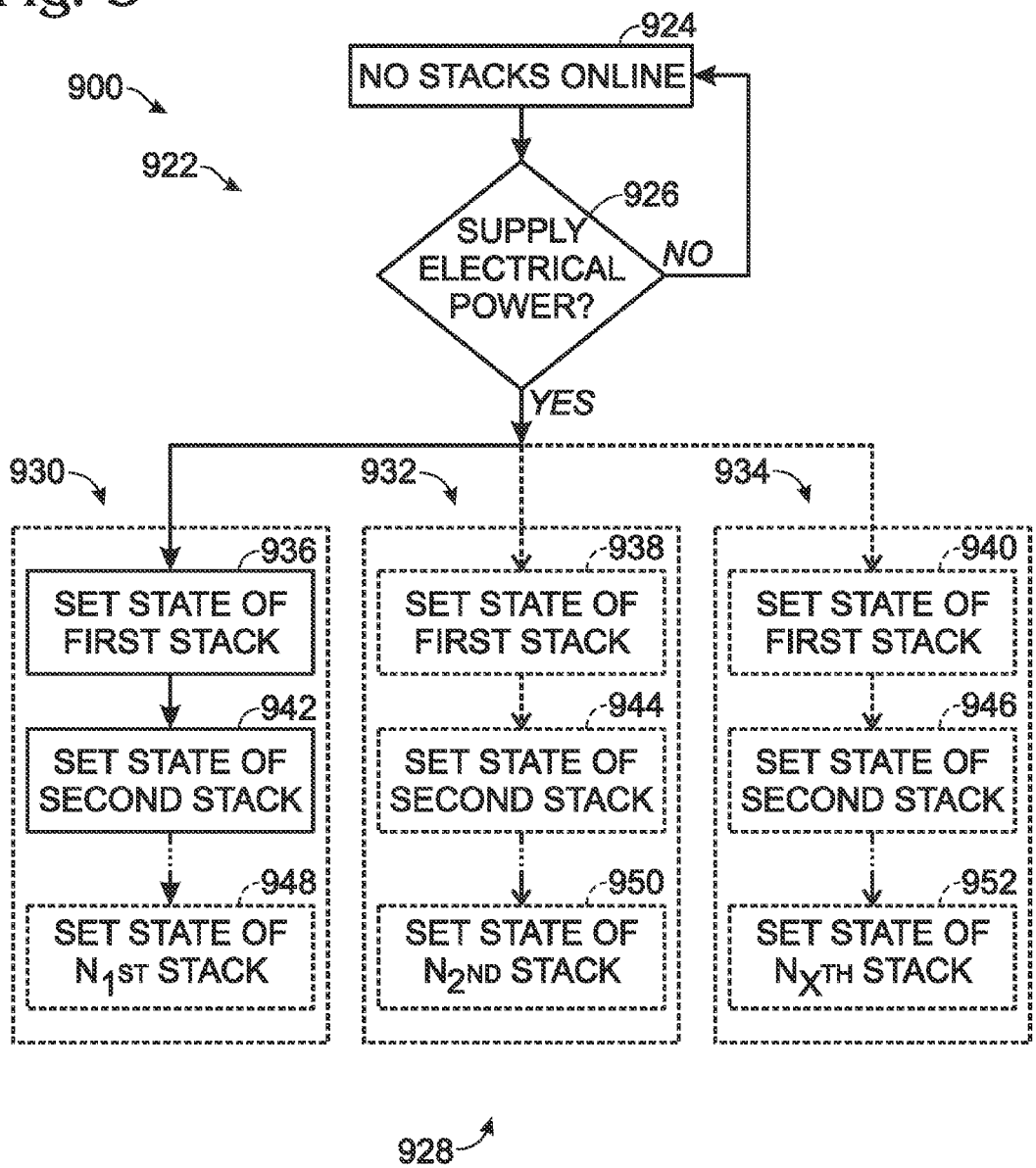

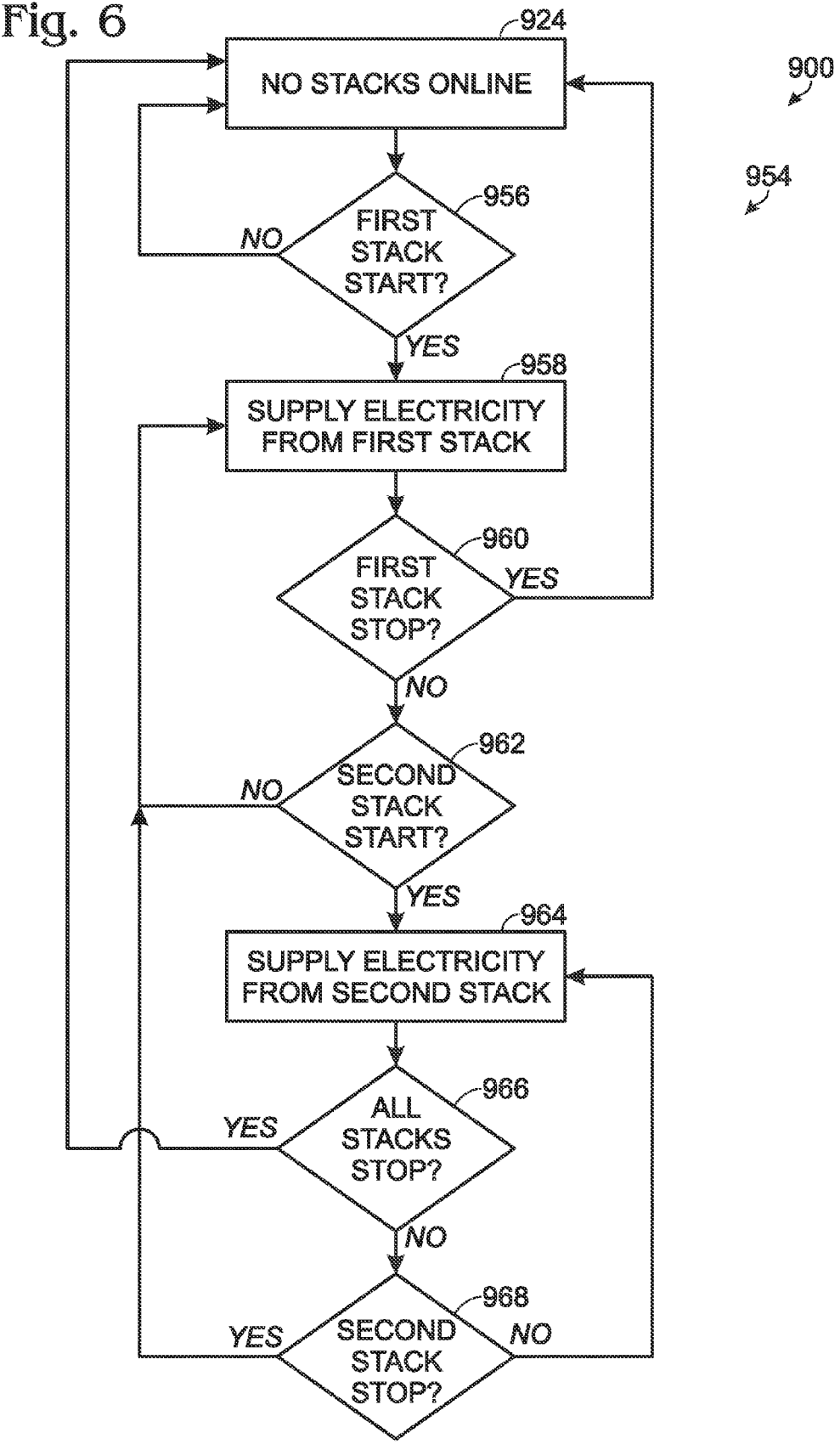

SYSTEMS AND METHODS FOR INDEPENDENTLY CONTROLLING THE OPERATION OF FUEL CELL STACKS AND FUEL CELL SYSTEMS INCORPORATING THE SAME

RELATED APPLICATION

The present application is a continuation of and claims priority to PCT Patent Application No. PCT/US10/38387, which was filed on Jun. 11, 2010 and which claims priority to provisional U.S. Patent Application Ser. No. 61/186,732, which was filed on Jun. 12, 2009, the complete disclosure of which is hereby incorporated by reference.

FIELD OF THE DISCLOSURE

The present disclosure is directed to systems and methods for independently controlling the operation of a plurality of electrical energy sources contained within an energy supply system, and more particularly to systems and methods for independently controlling at least a portion of a plurality of fuel cell stacks contained within a fuel cell system.

BACKGROUND OF THE DISCLOSURE

Fuel cell stacks are electrochemical devices that produce water and an electric potential from a fuel, which is typically a proton-liberating source, and an oxidant. Many conventional fuel cell stacks utilize hydrogen gas as the proton source and oxygen, air, or oxygen-enriched air as the oxidant. Fuel cell stacks typically include many fuels cells that are fluidly and electrically coupled together, often between common end plates. The fuel cell stack receives flows of hydrogen gas and air from suitable sources and distributes these flows to the individual fuel cells in the stack. The fuel cell stack includes manifolds and other delivery conduits to deliver and remove fluids to and from the fuel cells within the fuel cell stack. Conventionally, a fuel cell stack includes current collectors that are adapted to be electrically connected to an external load applied by an energy consuming device so that the electrical output produced by the fuel cell stack may be used to satisfy the applied external load.

The fuel cells in the fuel cell stack include anode and cathode regions that are separated by an electrolytic barrier, which may take the form of an electrolytic membrane. Hydrogen gas is delivered to the anode region, and oxygen gas is delivered to the cathode region. Protons from the hydrogen gas are drawn through the electrolytic membrane to the anode region, where water is formed. While protons may pass through the membranes, electrons cannot. Instead, the electrons that are liberated by the protons passing through the membranes travel through an external circuit to form an electric current.

Fuel cell systems may operate efficiently over a given range of electrical outputs. If the electrical output is greater than an upper threshold value, the fuel cell stack may generate excessive heat and/or dehydrate the electrolytic membranes contained therein, which may lead to irreparable damage to the fuel cell stack. In contrast, if the electrical output is less than a lower threshold, the fuel cell stack may not generate enough heat for efficient operation and/or otherwise may be operating inefficiently due to this reduced output. Energy consuming devices may apply an electrical load over a wide range of values depending on the energy demands of the energy consuming device, including electrical loads that are outside the efficient operating range of the fuel cell system.

Thus, there exists a need for systems and methods to extend the electrical output range over which the fuel cell system may efficiently provide electrical power.

SUMMARY OF THE DISCLOSURE

The present disclosure is directed to systems and methods for independently controlling the operation of fuel cell stacks and to fuel cell systems incorporating the same. These systems and methods may include providing a fuel cell system that includes a plurality of fuel cell stacks and at least a first energy storage device and controlling the operation of the plurality of fuel cell stacks based at least in part on a variable associated with the fuel cell system and/or an energy consuming device adapted to apply an electrical load to the fuel cell system. These systems and methods may further include beginning production of electrical output from the fuel cell system responsive to a start condition, initiating production of electrical output from the plurality of fuel cell stacks responsive to a plurality of stack start conditions, and ceasing the production of electrical output from the fuel cell stacks responsive to at least a first stack stop condition. In some embodiments, the fuel cell system may include a plurality of fuel cell assemblies, each including a plurality of fuel cell stacks, and forming a fuel cell bank. In some embodiments, the fuel cell system may include a single energy storage device. In some embodiments, the fuel cell system may include a plurality of energy storage devices. In some embodiments, the energy storage device may include a battery adapted to be charged by the fuel cell system and/or a primary power system. In some embodiments, the fuel cell system may form a backup power system adapted to provide electrical energy to the energy consuming device when the primary power system is unavailable and/or unable to do so. In some embodiments, the plurality of stack start conditions and/or the plurality of stack stop conditions may include the voltage of the energy consuming device. In some embodiments, the plurality of stack start conditions and/or the plurality of stack stop conditions may include the gross electrical power output from the fuel cell system, the net power output from the fuel cell system, and/or the gross power output from individual fuel cell stacks.

BRIEF DESCRIPTION OF THE DRAWINGS

FIG. 1 is a schematic representation of an illustrative, non-exclusive example of a fuel cell system according to the present disclosure.

FIG. 2 is a schematic representation of an illustrative, non-exclusive example of another fuel cell system according to the present disclosure.

FIG. 3 is a schematic representation of a fuel cell that may be utilized with the systems and methods according to the present disclosure.

FIG. 4 is a flow chart showing illustrative, non-exclusive examples of methods of operating a fuel cell system according to the present disclosure.

FIG. 5 is a flow chart showing illustrative, non-exclusive examples of methods of operating a fuel cell system bank according to the present disclosure.

FIG. 6 is a flow chart showing another illustrative, non-exclusive example of methods of operating a fuel cell system according to the present disclosure.

DETAILED DESCRIPTION AND BEST MODE OF THE DISCLOSURE

Figure 7:
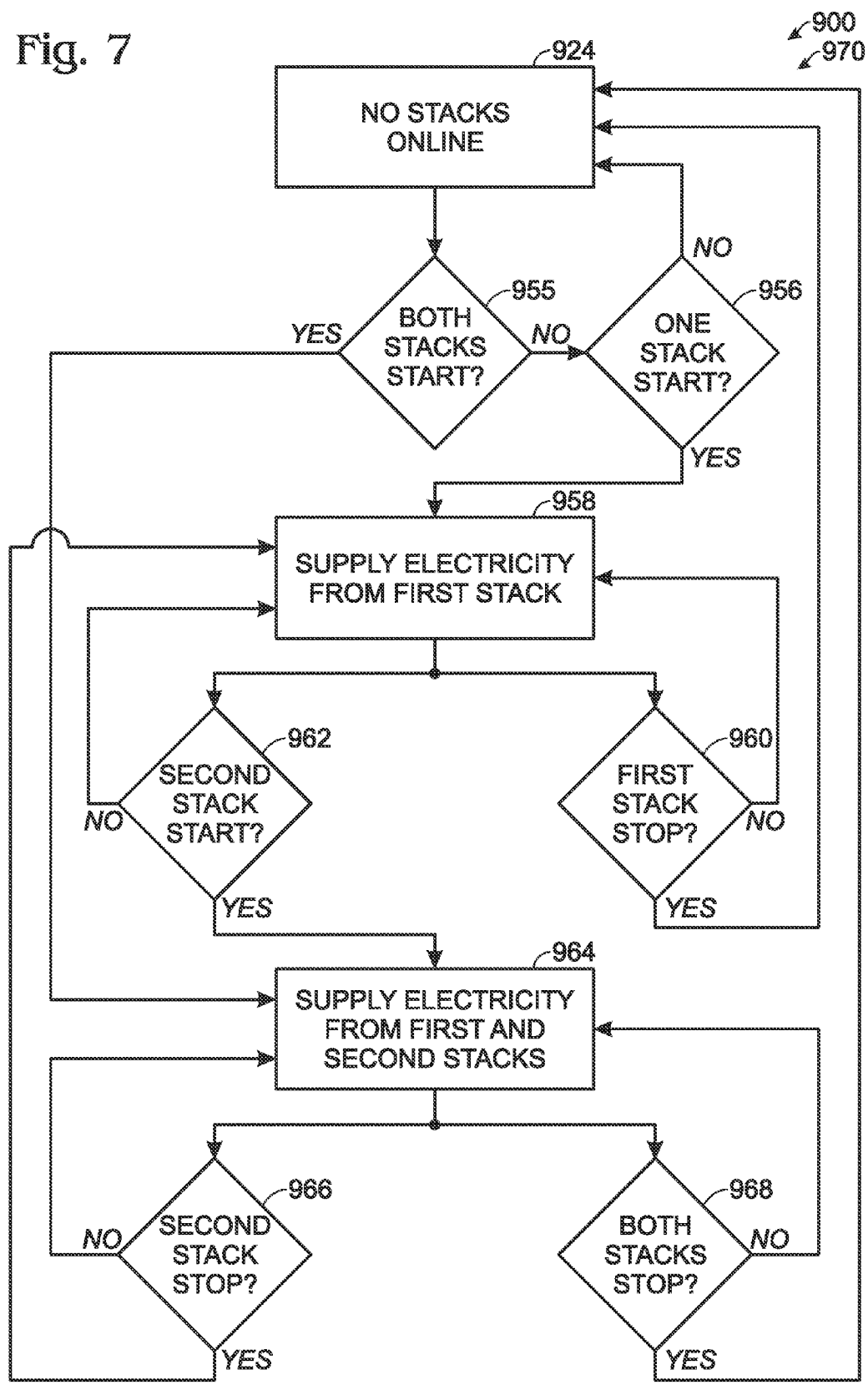
FIG. 7 is a flow chart showing another illustrative, non-exclusive example of methods of operating a fuel cell system according to the present disclosure.

The present disclosure is directed to systems and methods for independently controlling the operation of fuel cell stacks and to fuel cell systems incorporating the same. As discussed in more detail herein, these systems and methods may include providing a plurality of fuel cell stacks and at least a first energy storage device, beginning production of electrical output from the fuel cell system responsive to a start condition, initiating production of electrical output from the plurality of fuel cell stacks responsive to one or more of a plurality of stack start conditions, and ceasing the production of electrical output from the fuel cell stacks responsive to at least a first stack stop condition.

FIG. 1 provides an illustrative, non-exclusive example of an energy producing and consuming assembly 10 that includes a fuel cell system 20 according to the present disclosure. The energy producing and consuming assembly of FIG. 1 includes a reactant source 160 that may supply reactants 164 to fuel cell module 106. The fuel cell module may supply fuel cell output 101, such as electricity 102, to an optional power distribution system 400 before the fuel cell output is supplied to energy consuming device 605 and/or energy storage module 625, both of which may form a portion of energy consuming and storing assembly 600. Energy producing and consuming assembly 10 may further include control system 800. Energy producing and consuming assembly 10 may optionally be in electrical communication with a primary power system 30 and also may include a charger 635 that may be adapted to charge energy storage module 625 utilizing energy from primary power system 30. As used herein, the electrical output from the fuel cell system and/or fuel cell modules may be referred to as the power, power output, electrical current, electrical potential, and/or energy produced by the fuel cell system for fuel cell modules.

As discussed herein, the electrical output produced by one or more of the fuel cell stacks of fuel cell module 106 may be used to charge energy storage device 630, such as when the state of charge of the energy storage device drops below a threshold level, as described in more detail herein. This drop, or reduction, in the state of charge of the energy storage device may be caused by discharge of the energy storage device in response to an applied load from the energy consuming device and/or the fuel cell system. Additionally or alternatively, the electrical output from fuel cell module 106 may supply electrical energy to energy consuming device 605.

A portion of the plurality of fuel cell stacks 104 contained within fuel cell module 106 may operate at least partially independent of one another. For example, and as described in more detail herein, depending on the state of charge of energy storage device 630, only a portion of the plurality of fuel cell stacks 104 may be used to recharge energy storage device 630 and/or to supplement the output of energy storage device 630 to energy consuming device 605. Additionally or alternatively, if one of the fuel cell stacks fails, is damaged or in an off state, or is otherwise removed from operation, such as for maintenance, repair, and/or replacement, the other fuel cell stack(s) in the plurality of fuel cell stacks may continue to be available to produce an electrical output to charge the energy storage device and/or supply electrical output to energy consuming device 605.

Reactant source 160 may include oxidant supply system 200 and fuel supply system 300 and may supply reactants 164, such as oxidant 231 and fuel 302, to fuel cell module 106.

Fuel supply system 300 may include a hydrogen generation assembly 310 that produces a mixed gas stream from a feed stream. The mixed gas stream may include hydrogen gas as a majority component and may contain one or more other gases as minority components. The fuel processing system further may include a separation assembly 330 that is adapted to separate the mixed gas stream into a product hydrogen stream and a byproduct stream. In such an embodiment, the product hydrogen stream will have at least one of a greater concentration of hydrogen gas and a lower concentration of the other gases than the mixed gas stream. Likewise, the byproduct stream will have at least one of a lower concentration of hydrogen gas and a higher concentration of the other gases than the mixed gas stream (and the product hydrogen stream).

Hydrogen generation assemblies 310 according to the present disclosure may include a fuel processing system 312 and a feedstock delivery system 314, as well as the associated fluid conduits interconnecting various components of the system. As used herein, the term "hydrogen generation assembly" may be used to refer to fuel processing systems 312 and associated components of the energy-producing system, such as feedstock delivery system 314, heating assemblies, separation assemblies or devices 330, air delivery systems, fuel delivery systems, fluid conduits, heat exchangers, cooling assemblies, sensor assemblies, flow regulators, controllers, etc. All of these illustrative components are not required to be included in any hydrogen generation assembly or used with any fuel processing system according to the present disclosure. Similarly, other components may be included or used as part of the hydrogen generation assembly.

Fuel processing system 312 may include any suitable device(s) and/or structure(s) that are configured to produce hydrogen gas from the feedstock supply stream(s). Fuel processing system 312 may include a hydrogen-producing region 316. Accordingly, fuel processing system 312 may be described as including a hydrogen-producing region 316 that produces a hydrogen-rich stream that includes hydrogen gas as a majority component from the feedstock supply stream(s). While the hydrogen-rich stream contains hydrogen gas as its majority component, it also may contain other gases as minority components, and as such may be referred to as a mixed gas stream that contains hydrogen gas and other gases and/or as a reformat stream that contains hydrogen gas and other gases. Illustrative, non-exclusive examples of these other gases, or impurities, include one or more of carbon monoxide, carbon dioxide, water, methane, and unreacted feedstock.

Illustrative, non-exclusive examples of suitable mechanisms for producing hydrogen gas from feedstock supply stream(s) or feed stream(s) in hydrogen-producing region 316 include steam reforming and autothermal reforming, in which reforming catalysts are used to produce hydrogen gas from a feedstock supply stream containing water and at least one carbon-containing feedstock. Other illustrative, non-exclusive examples of suitable mechanisms for producing hydrogen gas include pyrolysis and catalytic partial oxidation of a carbon-containing feedstock, in which case the feedstock supply stream does not contain water. Still another suitable mechanism for producing hydrogen gas is electrolysis, in which case the feedstock is water. Illustrative, non-exclusive examples of suitable carbon-containing feedstocks include at least one hydrocarbon or alcohol. Illustrative, non-exclusive examples of suitable hydrocarbons include methane, propane, natural gas, diesel, kerosene, gasoline, and the like. Illustrative, non-exclusive examples of suitable alcohols include methanol, ethanol, and polyols, such as ethylene glycol and propylene glycol. Illustrative, nonexclusive examples of suitable fuel processing systems are disclosed in U.S. Pat. Nos. 6,221,117, 5,997,594, 5,861,137, and in U.S. Patent Application Publication Nos. 2001/0045061, 2003/0192251, and 2003/0223926. The complete disclosures of the above-identified patents and patent applications are hereby incorporated by reference.

Hydrogen 302 and oxygen 231 may be delivered to the respective regions of the fuel cell via any other suitable mechanism from respective sources 304 and 202. Illustrative, non-exclusive examples of suitable fuel sources 304 for hydrogen 302 include at least one pressurized tank, hydride bed or other suitable hydrogen storage device, and/or a fuel processor that produces a product, or hydrogen-rich, stream containing hydrogen gas. Illustrative, non-exclusive examples of suitable sources 202 of oxygen 231 include a pressurized tank of oxygen or air, or a fan, compressor, blower, or other device for directing air to the cathode region. As used herein, hydrogen gas and oxygen gas may be respectively referred to herein as hydrogen and oxygen. Illustrative, non-exclusive examples of fuel supply systems 300 and oxidant supply systems 200 according to the present disclosure are disclosed in U.S. Pat. Nos. 5,861,137, 5,997,594, 6,221,117, 6,376,113, 6,375,906, 6,537,352, 6,890,672, 7,128,769, 7,135,048, 7,601,302, 7,632,322, and 7,659,019, as well as U.S. Patent Application Publication Nos. 2001/0045061, 2003/0192251, 2003/0223926, 2007/0264546, 2007/0266631, 2007/0274904, 2008/0138678, 2008/0222954, 2009/0155642, and 2010/0028223, the complete disclosures of which are hereby incorporated by reference.

Feedstock delivery system 314 is adapted to deliver to fuel processing system 312 one or more feedstocks via one or more feed streams, which may be referred to generally as feedstock supply stream(s) and/or feed stream(s). Illustrative, non-exclusive examples of feedstock delivery systems are disclosed in U.S. Pat. Nos. 7,601,302, 6,375,906, 7,135,048, and 6,890,672 and U.S. Patent Application Publication No. 2009/0155642, the complete disclosures of which are hereby incorporated by reference. In the following discussion, reference may be made only to a single feedstock supply stream; however, it is within the scope of the present disclosure that two or more such streams, of the same or different composition, may be used. In some embodiments, air may be supplied to fuel processing system 312 via a blower, fan, compressor, or other suitable air delivery system, and/or a water stream may be delivered from a separate water source.

As discussed in more detail herein, hydrogen generation assemblies and/or fuel cell systems according to the present disclosure may include separation assembly 330 that is adapted to increase the purity of the hydrogen gas that is produced in the hydrogen generation assembly and/or delivered for consumption in the fuel cell stack to produce an electrical output therefrom. This increase in the purity of the hydrogen gas in the product hydrogen stream, compared to the purity of the hydrogen gas in the mixed gas stream may be produced by removing at least a portion of the other gases that are present in the mixed gas stream, such as by a physical and/or chemical separation process. For example, the impurities may be chemically reacted to form hydrogen gas, may be removed from the mixed gas stream to form at least a portion of the byproduct stream, and/or may be at least temporarily trapped or otherwise removed from the mixed gas stream. Illustrative, non-exclusive examples of suitable separation structures include pressure-based separation processes that may utilize at least one hydrogen-selective membrane, or membrane assembly and/or pressure swing adsorption using a PSA assembly. Additional illustrative, non-exclusive examples include methanation of the other gases using a methanation catalyst and/or water-gas shift reactions using a suitable shift catalyst. Illustrative, non-exclusive examples of suitable separation processes and structures are disclosed in U.S. Pat. Nos. 6,537,352, 6,494,937, 7,393,382, and 7,399,342 and in U.S. Patent Application Publication No. 2007/0266631, the complete disclosures of which are hereby incorporated by reference.

Fuel cell assembly 100 including fuel cell module 106 according to the present disclosure includes a plurality of fuel cell stacks 104, including two, three, four, or more than four fuel cell stacks. Additionally or alternatively, fuel cell module 106 may include a fuel cell bank or fuel cell array 108 that may include a plurality of fuel cell assemblies 110, each including at least two fuel cell stacks 104, including two, three, four, or more than four fuel cell stacks. Fuel cell stacks 104 according to the present disclosure may utilize any suitable fuel cell technology, including the polymer electrolyte membrane fuel cells discussed in more detail herein. Other illustrative, non-exclusive examples of fuel cells that may be utilized according to the present disclosure include direct formic acid fuel cells, alkaline fuel cells, and direct methanol fuel cells. The fuel cell stacks contained within fuel cell module 106 may be electrically connected in any suitable configuration.

Optional power distribution system 400, which also may be referred to as power management module 400, may control, regulate, filter, increase, reduce, manage, or otherwise direct and/or modify electrical output 102 from fuel cell module 106 and/or energy storage module electrical output 640 before supplying the electrical output to energy consuming device 605. Additionally or alternatively, power distribution system 400 may condition electrical output 102 from fuel cell module 106 prior to delivery to energy storage module 625 as charging current 645. Power distribution system 400 also may serve to electrically isolate one or more components of energy producing and consuming assembly 10 from one or more other components. As an illustrative, non-exclusive example, power distribution system 400 may enable electrical output to flow from fuel cell module 106 to energy consuming device 605 but may stop, block, or otherwise limit the flow of electrical energy from energy consuming device 605 to fuel cell module 106.

Illustrative, non-exclusive examples of power distribution systems 400 according to the present disclosure include any suitable transformer, DC/DC buck and/or boost converter, DC/AC inverter, power filter, diode, transistor, switch, relay, and the like. While shown as a single component at a single location, it is within the scope of the present disclosure that power distribution system 400 may include any suitable number of devices at any suitable location within energy producing and consuming assembly 10. As an illustrative, non-exclusive example, a portion of power distribution system 400 may be located between fuel cell module 106 and energy consuming device 605, between energy consuming device 605 and primary power system 30, between primary power system 30 and charger 635, between charger 635 and energy storage module 625, between energy storage module 625 and fuel cell module 106, and/or between energy storage module 625 and energy consuming device 605.

Energy consuming device 605 applies an (electrical) load to fuel cell system 20, such as to fuel cell module 106 and/or energy storage module 625, and draws an output from the system to satisfy the load. This load may be referred to as an applied load. It is within the scope of the present disclosure that the applied load may be satisfied by the fuel cell stack, the energy storage device, the primary power system, and/or any suitable combination of these devices. Illustrative, non-exclusive examples of energy consuming devices 605 include motor vehicles, recreational vehicles, boats and other sea craft, and any combination of one or more residences, commercial offices or buildings, neighborhoods, tools, lights and lighting assemblies, appliances, computers, industrial equipment, signaling and communications equipment, radios, electrically powered components on boats, recreational vehicles or other vehicles, battery chargers and even the balance-of-plant electrical requirements for fuel cell system 20.

Energy storage module 625 includes at least a first energy storage device 630 and is adapted to store potential energy for later use within energy producing and consuming assembly 10, such as by supplying energy storage module electrical output 640 to the energy producing and consuming assembly. The source of the stored potential energy may include fuel cell module 106, primary power system 30, and/or any other suitable energy source. It is within the scope of the present disclosure that energy storage module 625 may include a plurality of energy storage devices 630, including two, three, four, or more than four energy storage devices. These energy storage devices may be arranged in any suitable configuration, including series, parallel, and/or series/parallel configurations and also may be arranged in series, parallel, and/or series/parallel with fuel cell module 106. It is also within the scope of the present disclosure that individual energy storage devices 630 or groups of energy storage devices 630 within energy storage module 625 may be arranged in series, parallel, and/or series/parallel with individual fuel cell assemblies 110 or groups of fuel cell assemblies 110 within fuel cell bank 108. Illustrative, non-exclusive examples of energy storage devices 630 according to the present disclosure include any device capable of storing potential energy for later use and may include any suitable battery, capacitor, ultracapacitor, supercapacitor, and/or flywheel.

Optional primary power system 30 may include any suitable source of electrical power and may serve as the primary source of electrical power for energy consuming device 605. Thus, when energy producing and consuming assembly 10 includes and/or is in communication with and/or is configured for use with primary power system 30, it is within the scope of the present disclosure that fuel cell system 20 may include backup power system 25 that may provide power to energy consuming device 605 when primary power system 30 is unable to satisfy, supply, or meet the electrical requirements of the energy consuming device. By unable to satisfy, supply, or meet the electrical requirements of the energy consuming device, it is meant that the primary power system is currently, or at least temporarily, unable to satisfy the load applied by energy consuming device 605. This may include situations in which the primary power system is unavailable and/or unable to provide any electrical output, as well as situations in which the primary power system is producing an electrical output but the magnitude of the electrical output from the primary power system is insufficient to satisfy, supply, or meet the requirements of the energy consuming device, illustrative, non-exclusive examples of which include an increase in the load applied by the energy consuming device, a decrease in the electrical output from the primary power system, and/or a decrease in the stability of the electrical output from the primary power system.

Primary power system 30 may include any suitable source of potential energy, such as electrical energy. An illustrative, non-exclusive example of a primary power system 30 according to the present disclosure includes an electrical grid, such as an electrical grid that may be provided by an electrical utility. Additional illustrative, non-exclusive examples of primary power systems 30 according to the present disclosure include any suitable wind power source, solar power source, hydroelectric power source, geothermal power source, chemical power source, internal combustion power source, and/or the like.

Charger 635 may include any suitable structure that may convert the potential energy obtained from primary power system 30 into a form that may be utilized to charge the energy storage device(s) 630 of energy storage module 625. As an illustrative, non-exclusive example, when primary power system 30 includes a source of AC or DC electrical power and energy storage device(s) 630 include device(s) that are capable of storing an electrical charge, such as a suitable battery and/or capacitor, charger 635 may convert the electrical output from primary power system 30 into a form that may be utilized to charge energy storage devices 630 without damage to the energy storage devices, such as to a DC voltage at a current level that may safely and efficiently be utilized to charge the energy storage device(s). As another illustrative, non-exclusive example, when energy storage device 630 includes a device that may store mechanical potential energy such as, for example, a flywheel, charger 635 may convert the output from primary power system 30 into a rotational potential energy at a frequency that may be utilized to charge the energy storage device, such as by maintaining and/or increasing the rotational frequency of the flywheel.

As shown in FIG. 1 and discussed herein, energy producing and consuming assemblies 10 including fuel cell systems 20 according to the present disclosure may further include a control system 800, which may include a controller 805, that may be adapted to control the operation of at least a portion of the energy producing and consuming assembly based at least in part on a characteristic of the energy producing and consuming assembly. As an illustrative, non-exclusive example, and as shown in dash-dot lines in FIG. 1, controller 805 may receive status signals 810 indicative of the status of the various components of the energy producing and consuming assembly and may generate control signals 840 to control the operation of the various components of the energy producing and consuming assembly based at least in part on the status signals. This control may be implemented manually by the user, through the use of an electronic controller, or through a combination of the two. The controller may include any suitable type and number of devices or mechanisms to implement and provide for the desired monitoring and/or control of the energy producing and consuming assembly.

As illustrative, non-exclusive examples, a suitable controller may take the form of analog or digital circuitry, together with appropriate electronic instructions that may be stored on magnetic media or programmable memory such as read only memory (ROM), programmable read only memory (PROM), or erasable programmable read only memory (EPROM), and may be integrated into one or more systems or assemblies of energy producing and consuming assembly 10 or be a separate, stand-alone computing device. The controller may be adapted or otherwise programmed or designed to control the operation of the energy producing and consuming assembly in the plurality of operating states of the energy producing and consuming assembly, including the various components thereof. The controller, when present, also may include and/or be in communication with any suitable sensors and/or detectors 870, communications links, and the like to enable the desired monitoring and control of the operation of the energy producing and consuming assembly, including optional communication with other components of the energy producing and consuming assembly. Illustrative, non-exclusive examples of control systems 800 according to the present disclosure are described in U.S. Pat. Nos. 6,383,670, 6,495, 277, 6,811,908, 6,835,481, 6,979,507, 7,208,241, and 7,390,587, as well as in U.S. Patent Application Publication Nos. 2005/0266284, 2005/0266285, 2006/0024540, 2006/0134473, and 2008/0176118, the complete disclosures of which are hereby incorporated by reference.

The various systems and components of energy producing and consuming assembly 10 shown in FIG. 1 have been illustrated in a specific configuration. However, it is within the scope of the present disclosure that any suitable configuration may be utilized. As an illustrative, non-exclusive example, while a single charger 635 is illustrated in FIG. 1, it is within the scope of the present disclosure that any suitable number of chargers 635 may be utilized. This may include multiple chargers placed in parallel to increase capacity and/or provide redundancy, as well as a charger between fuel cell module 106 and energy storage module 625 to condition or otherwise modify charging current 645 prior to delivery to the fuel cell stack.

As another illustrative, non-exclusive example, and as discussed herein, energy consuming device 605 may be a separate device or group of devices that are powered by fuel cell system 20. However, it is also within the scope of the present disclosure that at least a portion of energy consuming device 605 may form a portion of fuel cell system 20, such as to form the balance-of-plant requirements of the fuel cell system.

As discussed, FIG. 1 is schematically illustrated. As will be evident, the other Figures are also schematically illustrated, with the Figures intended to provide illustrative, but non-exclusive, examples according to the present disclosure, and with the Figures not being intended to limit the scope of the present disclosure to a specific embodiment that is required to all systems and/or methods according to the present disclosure. The Figures are not intended to be drawn to scale, as they have been presented to emphasize and/or illustrate various aspects of the present disclosure. In the Figures, the same reference numerals designate like and corresponding, but not necessarily identical, elements through the various drawing Figures. Likewise in the Figures and corresponding textual disclosure, previously discussed subject matter and/or reference numerals may be presented in subsequent Figures and/or corresponding textual disclosure without repeating the discussion of such subject matter and/or reference numerals.

FIG. 2 provides another illustrative, non-exclusive example of energy producing and consuming assembly 10 including fuel cell system 20 according to the present disclosure. Therein, reactants 164, such as oxidant 231 and fuel 302 may be supplied to fuel cell stacks 104 of fuel cell module 106. In FIG. 2, fuel cell module 106 may be considered to include two fuel cell stacks 104. Alternatively, fuel cell module 106 may be considered to include a fuel cell bank 108, including two fuel cell assemblies 110, each including a plurality of fuel cell stacks 104. The number of fuel cell stacks, or alternatively fuel cell assemblies, shown is just an illustrative, non-exclusive example and, as discussed in more detail herein, fuel cell module 106 and/or fuel cell bank 108 may include any suitable number of fuel cell stacks 104 and/or fuel cell assemblies 110.

The electrical output 102 from fuel cell module 106 may be supplied to optional isolation device 405, which may form a portion of power distribution system 400. Isolation device 405 may serve to electrically isolate fuel cell module 106 from the remainder of the energy producing and consuming assembly. As an illustrative, non-exclusive example, isolation device 405 may include a diode assembly 408 that may limit or even prevent the flow of electrical current into fuel cell module 106, while enabling the flow of electrical current out of fuel cell module 106. Additional illustrative, non-exclusive examples include breakers and/or contactors that may be selectively activated to prevent the flow of electrical current into the fuel cell module. The energy producing and consuming assembly of FIG. 1 may further include energy storage module 625, in the form of battery 650, as discussed in more detail herein.

The electrical output from fuel cell module 106 and/or energy storage device electrical output 640 may be supplied to optional power conditioner 410, such as to converter 415 or inverter 420, which may condition or otherwise modify the electrical inputs received therein and output a conditioned fuel cell system electrical output 430 that may be compatible with the electrical requirements of energy consuming device 605 and may be supplied to the energy consuming device.

Control system 800, including controller 805, may receive status signals 810 from detectors 870 indicative of the status of various components within the energy producing and consuming assembly and may output control signals 840 to control the operation of at least a portion of the energy producing and consuming assembly. As illustrative, non-exclusive examples, controller 805 may receive primary power system status signal 812, which is indicative of the status of the primary power system, from primary power system detector 872, as well as battery status signal 814 and fuel cell module status signal 816 from battery status monitor 874 and fuel cell status monitor 876, respectively. As another illustrative, non-exclusive example, and based at least in part on (and/or responsive at least in part to) the value of these status signals, controller 805 may generate first stack control signal 842 and/or second stack control signal 844 to control the operation of first fuel cell stack 170 and/or second fuel cell stack 175.

Status signals 810 may be obtained from a variety of sources, including directly from the various components of energy producing and consuming assembly 10, as shown schematically in FIG. 1, and/or from a detector 870 designed to collect information about the status of the energy producing and consuming assembly and transmit this information to controller 805, as shown in FIG. 2. Illustrative, non-exclusive examples of status signals 810 that may be supplied directly from the various components of energy producing and consuming assembly 10 include signals generated within the various components, such as signals generated by a dedicated and/or shared controller for the component of interest. These signals may include signals that are indicative of the operational state of the component, signals that are indicative of the status of the various constituent parts of the component, and/or signals that are generated by a detector 870 that forms a part of the component. Illustrative, non-exclusive examples of status signals 810 that may be supplied by detectors 870 and/or by detectors that form a part of the component include any suitable temperature, pressure, flow rate, chemical composition, voltage, current, power, and/or state of charge status signals.

As an illustrative, non-exclusive example, primary power system detector 872 may detect a variable indicative of the operational status of primary power system 30. The primary power system may include at least an "on" or "available" state, in which the primary power system is available and able to supply an electrical output to energy consuming device 605, as well as an "off" or "unavailable" state, in which the primary power system may be unavailable and/or unable to supply an electrical output to energy consuming device 605, and the variable indicative of the operational status of the primary power system may include the operational state of the primary power system.

As another illustrative, non-exclusive example, primary power system detector 872 may detect a variable associated with the electrical output from the primary power system. This may include the voltage of the electrical output from the primary power system, the current of the electrical output from the primary power system, and/or the electrical power supplied by the primary power system.

As yet another illustrative, non-exclusive example, primary power system detector 872 may detect a variable associated with a relationship between the electrical power output from the primary power system and the applied load from energy consuming device 605. This may include detecting whether or not the electrical output from the primary power system is sufficient to supply the electrical load applied by the energy consuming device and/or detecting a ratio of the electrical output available from the primary power system to the electrical load applied by the energy consuming device.

As yet another illustrative, non-exclusive example, primary power system detector 872 may detect a variable associated with the stability of the electrical output from the primary power system and/or the stability of the load applied by the energy consuming device. This may include detecting a decrease in the stability of the primary power system, detecting a decrease in the voltage of the primary power system, and/or detecting a change in the impedance of the energy consuming device that may indicate a change in the ability of the primary power system to supply the load applied by the energy consuming device.

As yet another illustrative, non-exclusive example, battery status monitor 874 may detect a variable indicative of the status of energy storage module 625, energy storage device 630, and/or battery 650. This may include the state of charge of the energy storage device, the voltage of the energy storage device, the electrical power output from the energy storage device, the cumulative charge supplied to and/or supplied from the energy storage device over a given time period, the current output from the energy storage device, and/or the electrical impedance of the energy storage device.

As yet another illustrative, non-exclusive example, fuel cell status monitor 876 may detect a variable indicative of the status of fuel cell module 106, fuel cell bank 108, fuel cell assembly 110, and/or the fuel cell stacks 104 contained therein. The fuel cell module, fuel cell bank, fuel cell assembly, and/or fuel cell stacks contained therein may include at least a "running" state, in which the fuel cell stack is producing an electrical output, an "off" state, in which the fuel cell stack is not producing an electrical output and is not presently able, or ready, to produce an electrical output, and an "idle" state, in which the fuel cell stack is not producing an electrical output but may begin producing an electrical output within a short period of time, such as in less than 5 minutes, 3 minutes, 1 minute, 30 seconds, or 1 second. Under these conditions, the variable indicative of the status of fuel cell module 106 may include the operational state of the fuel cell module, fuel cell bank, fuel cell assembly, and/or fuel cell stacks contained therein.

As yet another illustrative, non-exclusive example, fuel cell status monitor 876 may detect a variable indicative of the electrical output from the fuel cell module, fuel cell bank, fuel cell assembly, and/or fuel cell stacks contained therein. This may include the voltage output, current output, electrical power output, thermal output, and/or reactant consumption rate of the fuel cell module, fuel cell bank, fuel cell assembly, and/or fuel cell stacks contained therein.

Controller 805 may control the operation of fuel cell system 20 based directly on the value of status signals 810 and/or based on derived and/or calculated values that may include status signals 810. An illustrative, non-exclusive example of a derived and/or calculated value according to the present disclosure may include the gross power output from the fuel cell system, which may be calculated based on the energy storage device power output detected by battery status monitor 874 and the fuel cell power output detected by fuel cell status monitor 876. Another illustrative, non-exclusive example of a derived and/or calculated value according to the present disclosure may include the net power output from the fuel cell system, which may be calculated based on the energy storage device power output, the fuel cell power output, and the power consumption of the fuel cell system. Additionally or alternatively, the net power output from the fuel cell system may be detected by monitoring the electrical power output from the fuel cell system such as, for example, by monitoring the electrical power of conditioned fuel cell system electrical output 430.

As discussed in more detail herein, control system 800, including controller 805, may generate control signals 840, including first stack control signal 842 and second stack control signal 844, based at least in part on status signals 810. Control signals 840 may control the operation of fuel cell stacks 104, such as first fuel cell stack 170 and second fuel cell stack 175. This may include controlling the operational state of the fuel cell stacks between at least the running, off, and idle states, as well as controlling the electrical power output from the fuel cell stacks. This control may be accomplished by any suitable method, such as by direct control of the fuel cell stacks, by control of the electrical output from the fuel cell stacks, and/or by control of the reactants supplied to the fuel cell stacks.

Illustrative, non-exclusive examples of direct control of the fuel cell stacks may include controlling the temperature of the fuel cell stacks, the pressure of reactants within the fuel cell stacks, and/or the flow rate of reactants to and/or through the fuel cell stacks. Illustrative, non-exclusive examples of control of the electrical output from the fuel cell stacks may include controlling the electrical load applied to the fuel cell stacks, such as may be accomplished by controlling the electrical impedance of energy consuming device 605 and/or power distribution system 400, and/or controlling the flow of electrical current from the fuel cell stack through the use of any suitable switch, contactor, transistor, and/or relay. Illustrative, non-exclusive examples of control of the reactants supplied to the fuel cell stacks may include controlling the temperature, pressure, chemical composition, and/or flow rate of the reactants supplied to the fuel cell stack and may include the use of any suitable temperature, pressure, and/or flow control assemblies contained within reactant source 160, oxidant supply system 200, and/or fuel supply system 300.

While the above discussion includes control of first fuel cell stack 170 and second fuel cell stack 175 through the use of first stack control signal 842 and second stack control signal 844, it is within the scope of the present disclosure that, as discussed in more detail herein, fuel cell system 20 may include any suitable number of fuel cell stacks 104, fuel cell assemblies 110, and/or fuel cell banks 108 contained within fuel cell module 106 and arranged in any suitable configuration. It is further within the scope of the present disclosure that the fuel cell stacks contained within fuel cell module 106 may be controlled individually, such as by including separate control signals 840 for each fuel cell stack 104 or that the fuel cell stacks may be controlled in groups, such as by including control signals 840 that may control the operation of a plurality of fuel cell stacks.

An illustrative, non-exclusive example of a fuel cell 116 that may be utilized with the systems and methods according to the present disclosure, in the form of a polymer electrolyte membrane (PEM) fuel cell, is shown schematically in FIG. 3. The fuel cell may be described as forming a portion of an energy producing and consuming assembly, as generally indicated at 10, a portion of a fuel cell system, such as generally indicated at 20, a portion of a fuel cell assembly 100, and/or a portion of a fuel cell stack, such as generally indicated at 104. Proton exchange membrane fuel cells typically utilize a membrane-electrode assembly 119 including an ion exchange, or electrolytic, membrane 118 located between an anode region 122 and a cathode region 124. Each region 122 and 124 includes an electrode 120, namely an anode 126 (or anode electrode) and a cathode 128 (or cathode electrode), respectively, which may form a part of membrane-electrode assembly 119. Each region 122 and 124 also may include a support 130, such as a supporting plate 132. Support 130 may form a portion of a bipolar plate assembly located between the membranes of adjacent fuel cells in a fuel cell stack. The supporting plates 132 of fuel cell 116 may be configured or otherwise utilized to carry the relative voltage potential resulting from the fuel cell reaction, such as in response to the applied load.

In operation, fuel supply system 300 supplies fuel 302 to the anode region from fuel source 304, while oxidant supply system 200 supplies oxidant 231 to the cathode region from oxidant source 202. Fuel 302 also may be referred to as supply fuel 302. A typical, but not exclusive, fuel for fuel cell 116 is hydrogen, and a typical, but not exclusive, oxidant is oxygen. As used herein, hydrogen refers to hydrogen gas and oxygen refers to oxygen gas. The following discussion may refer to fuel 302 as hydrogen 302 and oxidant 231 as oxygen 231, although it is within the scope of the present disclosure that other fuels and/or oxidants may be used. A suitable source of oxygen gas is air, such as from air proximate the fuel cell system. This air may be referred to herein as ambient air.

Hydrogen and oxygen combine with one another within the fuel cell via an oxidation-reduction reaction. Although membrane-electrode assembly 119 restricts the passage of a hydrogen molecule, it will permit a hydrogen ion (proton) to pass therethrough, due largely to the ionic conductivity of membrane 118. The catalytic activity of the electrode material lowers the hydrogen dissociation energy, allowing the hydrogen gas to dissociate into protons and free electrons. The ionic potential gradient from the oxidation-reduction reaction at the membrane interface drives the protons through the ion exchange membrane. As membrane 118 also tends not to be electrically conductive, fuel cell output 101, in the form of a free electron flow, or electricity, 102, flows through energy delivery system 500 via an external circuit 502 to form energy delivery system electrical output 501, which is supplied to energy consuming and storing assembly 600. Also shown in FIG. 3 are an anode purge or exhaust stream 134, which may contain unreacted hydrogen gas, and a cathode purge or exhaust stream 136, which may contain unreacted oxygen gas.

The fuel cell systems described herein may be utilized with any suitable method of operation. Illustrative, non-exclusive examples of suitable methods 900 for controlling the operation of these fuel cell systems are shown schematically in FIGS. 4-7. These methods, or logics, 900 may be adapted to recharge the one or more energy storage devices 630 of energy producing and consuming assembly 10 with one or more of the fuel cell stacks of fuel cell module 106 during periods in which the energy storage device(s) are supplying electrical output to energy consuming device 605 and/or during periods in which the state of charge of the energy storage device falls below a threshold level.

As an illustrative, non-exclusive example, upon a system start condition being met, such as the loss of power from primary power system 30, backup power system 25 may provide backup power to energy consuming device 605, and the backup power system may be configured such that one or more of the energy storage devices of energy storage module 625 may provide at least a portion, if not all, of the electrical output necessary to satisfy the load applied by the energy consuming device. Thus, during a sustained period in which the primary power system is unavailable, or otherwise not presently able to provide the electrical output necessary to satisfy the applied load, energy storage device 630 may become at least partially depleted of stored energy. If the energy consuming device drains or otherwise discharges the energy storage device below a threshold level and/or draws current or power above a threshold level, the energy storage device may become incapable of sufficiently powering the energy consuming device. To avoid such a situation, methods 900 provide for one or more fuel cell stacks 104 to recharge energy storage device 625 and/or supplement the electrical output of the energy storage device to the energy consuming device. This recharging may include active charging of the energy storage device, as may be accomplished by energy storage device charging subroutine 904 of FIG. 4. Additionally or alternatively, this charging may include passive charging of the energy storage device, such as may be accomplished when fuel cell module 106 is supplying electrical output and any excess electrical output from the fuel cell module that is not needed to supply energy consuming device 605 may flow to the energy storage device as charging current 645.

FIG. 4 illustrates a method 901 of controlling the operation of a fuel cell system 20 that may include a plurality of fuel cell stacks 104 and at least a first energy storage device 630. The method may optionally include determining the status of the primary power system at 902, such as through the use of primary power system detector 872. If the primary power system is able to meet the electrical requirements of the energy consuming device, the Yes leg may be followed to subroutine 904, which may charge the energy storage device as needed. This may include the steps of determining if the state of charge of the energy storage device is greater than a threshold state of charge, $T_{float}$, at block 906, such as through the use of fuel cell status monitor 876, transitioning at least a first fuel cell stack to the running state, and utilizing the electrical output from the fuel cell stack to charge the energy storage device at 910 if the state of charge of the energy storage device is below the threshold state of charge level, and/or transitioning all fuel cell stacks to the off state at block 908 and returning to block 902 if the state of charge of the energy storage device is above the threshold state of charge level.

If the primary power system is not able to meet the electrical requirements of the energy consuming device, the No leg may be followed from block 902 to block 912, wherein backup power system 25 may supply electrical power to the energy consuming device. Initially, this may include supplying electrical power from energy storage device 630, though it is also within the scope of the present disclosure that block 912 may additionally or alternatively include supplying electrical energy from at least one of the plurality of fuel cell stacks 104. The method may then move to blocks 914, 916, 918, and 920, each of which may set the operational state of an individual fuel cell stack and/or group of fuel cell stacks contained within fuel cell module 106. As may be seen from FIG. 4, the fuel cell system utilized with method 901 includes at least two fuel cell stacks and may optionally include more than two fuel cell stacks, such as three, four, five, or even N fuel cell stacks. As used herein N fuel cell stacks may refer to any integer number of fuel cell stacks that is greater than or equal to two.

If the state of charge of the energy storage device does not fall (i.e., decrease) below a predetermined level and/or if a predetermined stack start condition is not satisfied, fuel cell stacks 104 may not be utilized to recharge the energy storage device and/or supply electrical output to the energy consuming device. Alternatively, if the state of charge of the energy storage device does fall below a predetermined level and/or if a predetermined stack start condition is satisfied, setting the operational state of the individual fuel cell stacks may include transitioning the fuel cell stacks from an off or idle state, in which no electrical output is being produced, to a running state, in which electrical output is being produced.

Setting the operational state of the $N^{th}$ fuel cell stack may include determining if a stack start condition for the $N^{th}$ fuel cell stack has been met, determining if a stack stop condition for the $N^{th}$ fuel cell stack has been met, and/or determining if a stack stop condition for all fuel cell stacks has been met. When the stack start condition for the $N^{th}$ fuel cell stack has been met and the $N^{th}$ fuel cell stack is currently in the off or idle state, the fuel cell system may transition the $N^{th}$ fuel cell stack to the running state. When the stack start condition for the $N^{th}$ fuel cell stack has been met and the $N^{th}$ fuel cell stack is currently in the running state, the system may maintain the $N^{th}$ fuel cell stack in the running state. Similarly, when the stack stop condition for the $N^{th}$ fuel cell stack has been met and the $N^{th}$ fuel cell stack is currently in the running state, the system may transition the $N^{th}$ fuel cell stack to the off state and/or the idle state. When the stack stop condition for the $N^{th}$ fuel cell stack has been met and the $N^{th}$ fuel cell stack is currently in the idle state, the system may maintain the $N^{th}$ fuel cell stack in the idle state or transition the $N^{th}$ fuel cell stack to the off state. When the stack stop condition for the $N^{th}$ fuel cell stack has been met and the $N^{th}$ fuel cell stack is currently in the off state, the system may maintain the $N^{th}$ fuel cell stack in the off state.

The stack start conditions and stack stop conditions may include triggers, events, and/or conditions that initiate a response from control system 800. These triggers, events, and/or conditions may include the occurrence of a specific event, the detection of a specific event, change and/or variation in a system parameter, and/or the detection that a parameter is greater than, less than, and/or equal to a threshold value. Specific stack start conditions and stack stop conditions according to the present disclosure are discussed in more detail herein.

Transitioning the $N^{th}$ fuel cell stack to the running state also may be referred to as initiating production of electrical output from the fuel cell stack and may include supplying the fuel stream and/or the oxidant stream to the fuel cell stack, producing electrical output from the fuel cell stack, and/or supplying the electrical output from the fuel cell stack to the energy consuming device. Similarly, transitioning the $N^{th}$ fuel cell stack to the off or idle states also may be referred to as ceasing production of electrical output from the fuel cell stack and may include ceasing the delivery of the fuel stream and/or the oxidant stream to the fuel cell stack, ceasing the production of electrical output from the fuel cell stack, and/or ceasing the supply of electrical output from the fuel cell stack to the energy consuming device.

Illustrative, non-exclusive examples of stack start conditions according to the present disclosure may include determining that the output voltage of energy storage device 630 is below a stack start threshold voltage level, such as through the use of detector 870, such as battery status monitor 874. Energy storage device 630 may include a fully charged output voltage and illustrative, non-exclusive examples of stack start threshold voltage levels according to the present disclosure may include energy storage device output voltages that are 50-99% of the fully charged output voltage, including energy storage device output voltages that are 70, 75, 80, 85, 90, 95, 96, 97, and 98% of the fully charged output voltage. As another illustrative, non-exclusive example, when energy storage device 630 has a nominal output voltage of 48 volts, the fully charged output voltage of the energy storage device may be greater than 48 volts. As an illustrative, non-exclusive example, when the fully charged output voltage of the energy storage device is 54 volts, stack start threshold voltage levels according to the present disclosure may include output voltage threshold levels of 40-53 volts, including output voltage threshold levels of 45, 47, 48, 49, 50, 51, 52, and 53 volts. As mentioned, an energy storage device 630 with a 54 volt fully charged output voltage is but one illustrative, non-exclusive example, and the present disclosure may be used with energy storage devices 630 having other fully charged output voltages, such as which are greater or less than this non-exclusive example. One such specific (non-exclusive) example is an energy storage device 630 that has a fully charged output voltage of approximately 20-30 volts.

Another illustrative, non-exclusive example of stack start conditions according to the present disclosure may include detecting that primary power system 30 is unable to supply the electrical load applied by energy consuming device 605. This may include detecting any of the variables discussed herein with reference to primary power system detector 872.

Another illustrative, non-exclusive example of stack start conditions according to the present disclosure may include detecting that the load applied to the fuel cell stack and/or that the power output from the fuel cell stack is greater than a stack start threshold power level. This may include detecting that the gross power output from fuel cell system 20 and/or backup power system 25 is greater than a stack start threshold power level, determining that the gross power output from fuel cell module 106 is greater than a stack start threshold power level, and/or determining that the net power output from the fuel cell system is greater than a stack start threshold power level. As used herein, gross power output from the fuel cell system may include the power output from fuel cell module 106 and the power output from energy storage device 625, while the net power output from the fuel cell system may include the power output from the fuel cell system, such as through conditioned fuel cell system electrical output 430, and may include the gross power output from the fuel cell system minus the balance of plant requirements of the fuel cell system.

When fuel cell system 20 and/or backup power system 25 includes a nominal, or customary, power output, illustrative, non-exclusive examples of stack start threshold power levels according to the present disclosure may include stack start threshold power levels that are 10-75% of the gross or net nominal power output from the fuel cell system, fuel cell stack, fuel cell assembly, and/or fuel cell bank, including stack start threshold power levels of 15%, 20%, 25%, 30%, 40%, 50%, 60%, and 70% of the nominal power output from the fuel cell system, fuel cell stack, fuel cell assembly, and/or fuel cell bank. As another illustrative, non-exclusive example, when the nominal net power output from the fuel cell system is 5,000 watts, stack start threshold power levels according to the present disclosure may include net power outputs from the fuel cell system of 500-3750 watts, including threshold power levels of 750, 1000, 1500, 2000, 2500, and 3000 watts.

Yet another illustrative, non-exclusive example of stack start conditions according to the present disclosure may include any of the above stack start conditions and/or combinations of conditions being detected for a threshold time period. This threshold time period may include time periods of greater than 1 second, including time periods of greater than 5, 10, 30, 45, 60, 90, 120, 180, 240, 600, and 1000 seconds.

In addition, any of the above stack start conditions may be combined with any of the other stack start conditions and/or with any other suitable trigger in logical "and" and/or "or" combinations. As an illustrative, non-exclusive example, suitable stack start conditions according to the present disclosure may include detecting that the output voltage of the energy storage device is less than a stack start threshold voltage level for a threshold time period, detecting that the primary power system is unable to satisfy the electrical requirements of the energy consuming device and that output voltage of the energy storage device is less than a stack start threshold voltage level, detecting that the net and/or gross power output from the fuel cell system or any suitable component thereof is less than a stack start threshold power level for a threshold time period, and/or detecting that the primary power system is unable to satisfy the electrical requirements of the energy consuming device and that the power output from the fuel cell system is greater than a threshold level for a threshold time period.

Illustrative, non-exclusive examples of stack stop conditions according to the present disclosure may include determining that the output voltage of energy storage device 630 is above a stack off threshold voltage level, such as through the use of detector 870, such as battery status monitor 874. Illustrative, non-exclusive examples of stack off threshold voltage levels according to the present disclosure may include the stack start threshold voltage levels discussed herein. This threshold voltage level may include the fully charged voltage of the energy storage device and also may be referred to as a float voltage of the energy storage device, a float potential energy of the energy storage device, and/or a float level of charge of the energy storage device.

Another illustrative, non-exclusive example of stack stop conditions according to the present disclosure may include detecting that primary power system 30 is able to satisfy the electrical load applied by energy consuming device 605. This may include detecting any of the variables discussed herein with respect to primary power system detector 872.

Another illustrative, non-exclusive example of stack stop conditions according to the present disclosure may include detecting that the load applied to the fuel cell stack and/or that the power output from the fuel cell stack is less than a stack off threshold power level. Similar to the stack start threshold power level described herein, this may include detecting that the gross power output from the fuel cell system, gross power output from fuel cell module 106, and/or the net power output from the fuel cell system is less than the stack off threshold power level. This also may include detecting that the gross power output from an individual fuel cell stack, fuel cell bank, and/or fuel cell assembly is less than the stack off threshold power level. Illustrative, non-exclusive examples of stack off threshold power levels according to the present disclosure may include stack off threshold power levels that are less than 50% of the nominal net or gross power output from the fuel cell system, fuel cell stack, fuel cell bank, and/or fuel cell assembly, including stack off threshold power levels that are less than 40%, 30%, 25%, 20%, 15%, 10%, 5%, 3%, 2%, or 1% of the nominal net or gross power output. As another illustrative, non-exclusive example, when the nominal net power output from the fuel cell system is 5000 watts, stack off threshold power levels according to the present disclosure may include net power levels of less than 2500 watts, including net power levels that are less than 2000, 1500, 1000, 750, 600, 500, 400, 300, 200, 100, 50, or 25 watts. Fuel cell systems according to the present disclosure may have nominal net power outputs that are greater or less than this illustrative, non-exclusive example of 5000 watts, with illustrative, non-exclusive examples of net power outputs that are greater than 5000 watts including 10,000 watts and 15,000 watts.

Yet another illustrative, non-exclusive example of stack stop conditions according to the present disclosure may include any of the above stack stop conditions and/or combinations of conditions being detected for a threshold time period. This threshold time period may include time periods of greater than 1 second, including time periods of greater than 5, 10, 30, 45, 60, 90, 120, 180, 240, 600, and 1000 seconds.

Similar to the discussion above with respect to stack start conditions, any of the above stack stop conditions may be combined with any of the other stack stop conditions and/or with any other suitable trigger in logical "and" and/or "or" combinations. As an illustrative, non-exclusive example, stack stop conditions according to the present disclosure may include detecting that the output voltage of the energy storage device is greater than a stack off threshold voltage level for a threshold time period, detecting that the primary power system is able to satisfy the electrical requirements of the energy consuming device and that the output voltage of the energy storage device is greater than a stack off threshold voltage level, detecting that the net and/or gross power output from the fuel cell system or any suitable component thereof is less than a stack off threshold power level for a threshold time period, and/or detecting that the primary power system is able to satisfy the electrical requirements of the energy consuming device and that the gross and/or net power output from the fuel cell system or any suitable component thereof is less that a threshold level for a threshold time period.

As discussed in more detail herein, the disclosed systems and methods may be utilized with a single fuel cell system that includes at least two fuel cell stacks and at least a first energy storage device. Additionally or alternatively, the systems and methods may be utilized with a bank or array of fuel cell assemblies, with each fuel cell assembly including at least two fuel cell stacks. Thus, the systems and methods may include providing and/or controlling the operation of the plurality of fuel cells contained within the bank of fuel cell assemblies. FIG. 5 provides an illustrative, non-exclusive example of a method 922 for controlling the operation of a bank, or network, 928 of fuel cell assemblies 930, 932, and 934. As discussed in more detail herein, each fuel cell assembly may include a plurality of fuel cell stacks, such as $N_i$ fuel cell stacks, wherein $N_i$ is an integer greater than or equal to two.

The method may include starting with no fuel cell stacks online at block 924. At block 926, the method determines whether or not the fuel cell system should supply electrical power to the energy consuming device. This may include detecting a change in the load applied by the energy consuming device, detecting a change in the electrical power output from the primary power system (if utilized), detecting a user-generated signal, detecting a system start signal, and/or detecting that any of the stack start conditions discussed herein with reference to FIG. 4 have been met. If it is determined that the fuel cell system does not need to supply electrical power to the energy consuming device, the No leg may be followed back to block 924. If it is determined that the fuel cell system does need to supply electrical power to the energy consuming device, the Yes leg may be followed, providing parallel control of fuel cell assemblies 930, 932, and 934. In blocks 936, 938, and 940, the operational state of the first fuel cell stack in each fuel cell assembly may be set. In blocks 942, 944, and 946, the operational state of the second fuel cell stack in each fuel cell assembly may be set. In blocks 948, 950, and 952, the operational state of the $N_i^{th}$ fuel cell stack in each fuel cell assembly may be set.

Setting the operational state of any fuel cell stack may include comparing the value of various parameters to the stack start conditions and/or stack stop conditions that are discussed herein with reference to FIG. 4. While the fuel cell bank of FIG. 5 is shown including three fuel cell assemblies, first fuel cell assembly 930, second fuel cell assembly 932, and $X^{th}$ fuel cell assembly 934, it is within the scope of the present disclosure that any suitable number of fuel cell assemblies may be utilized. Thus, X may include any positive integer, including 1, 2, 3, 4, 5, 10, or more than 10. In addition, each fuel cell assembly may include two or more fuel cell stacks. Thus, $N_i$ may be any positive integer greater than 2, including 3, 4, 5, 10, or more than 10. In addition, the number of fuel cell stacks in fuel cell assembly i, $N_i$, may be the same for each fuel cell assembly or may differ for at least a portion of the fuel cell assemblies.

It is within the scope of the present disclosure that each fuel cell assembly 110 contained within fuel cell bank 928 may include unique system start conditions and/or that each fuel cell stack contained within the fuel cell assemblies 110 of fuel cell bank 928 may include unique stack start conditions and/ or stack stop conditions. It is also within the scope of the present disclosure that at least a portion of the fuel cell stacks contained within fuel cell bank 928 may share common stack start conditions and/or stack stop conditions with a portion of the other fuel cell stacks contained within the fuel cell bank.

It is further within the scope of the present disclosure that the system start conditions, stack start conditions, and/or stack stop conditions for the fuel cell stacks contained within the fuel cell bank may be scaled based on the number of fuel cell assemblies and/or the nominal output of the fuel cell assemblies contained within fuel cell bank 108. As an illustrative, non-exclusive example, system start conditions, stack start conditions, and/or stack stop conditions according to the present disclosure may include the gross and/or net power output from fuel cell bank 108. If the fuel cell bank includes three fuel cell assemblies, each with similar nominal power output ratings, P, the system start conditions, stack start conditions, and/or stack stop conditions for the first fuel cell assembly in fuel cell bank 108 may be described by X*P, where $0 \leq X \leq 1$. Similarly, the system start conditions, stack start conditions, and/or stack stop conditions for the second fuel cell assembly in fuel cell bank 108 may be described by Y*P, where $0 \leq Y \leq 2$; and the system start conditions, stack start conditions, and/or stack stop conditions for the third fuel cell assembly in fuel cell bank 108 may be described by Z*P, wherein $0 \leq Z \leq 3$. Thus, if $X \neq Y \neq Z$, the various state transitions for the fuel cell assemblies of the fuel cell bank may occur at different times.

FIG. 6 provides an illustrative, non-exclusive example of a method 954 according to the present disclosure for operating fuel cell system 20 including two fuel cell stacks and at least a first energy storage device. Similar to the method of FIG. 5, the method of FIG. 6 may start at block 924 with no stacks online. The method may then transition to block 956, wherein the method determines if a first stack start condition has been met. If the first stack start condition has not been met, the No leg may be followed back to block 924. If the first stack start condition has been met, the Yes leg may be followed to block 958, wherein the supply of electrical output from the first fuel cell stack may be initiated. The method may then move to block 960, wherein the method determines if a first stack stop condition has been met. If the first stack stop condition has been met, the Yes leg may be followed back to block 924 and the supply of electrical output from the first fuel cell stack may be stopped. If the first stack stop condition has not been met, the No leg may be followed to block 962, wherein the method determines if a second stack start condition has been met. If the second stack start condition has not been met, the No leg may be followed back to block 958. If the second stack start condition has been met, the Yes leg may be followed to block 964, wherein the supply of electrical output from the second fuel cell stack may be initiated. The method may then transition to block 966, wherein the method determines if a both stack stop condition has been met. If the both stack stop condition has been met, the Yes leg may be followed back to block 924 and the supply of electrical output from both fuel cell stacks may be stopped. If the both stack stop condition has not been met, the No leg may be followed to block 968, wherein the method determines if a second stack stop condition has been met. If the second stack stop condition has been met, the Yes leg may be followed back to block 958 and the supply of electrical output from the second fuel cell stack may be stopped but the supply of electrical output from the first fuel cell stack may be continued. If the second stack stop condition has not been met, the No leg may be followed back to block 964 and the supply of electrical output from both fuel cell stacks may be continued.

FIG. 7 provides an illustrative, non-exclusive example of a method 970 for operating a fuel cell system that includes two fuel cell stacks and may be substantially similar to the method of FIG. 6. However, in FIG. 7, the determinations of decision blocks 960 and 962 and those of decision blocks 966 and 968 may be performed in parallel instead of in series. In addition, FIG. 7 includes the optional decision block at 955 that may determine if a two stack start condition has been met. If the two stack start condition has been met, the method may transition directly to block 964, wherein the system may initiate electrical output from both the first and the second fuel cell stacks. If the two stack start condition has not been met, the method may follow the No leg to block 956 and proceed in a substantially similar fashion to that of FIG. 6. Thus, the various steps of the methods disclosed herein may be completed in any suitable order, additional steps may be added, and/or steps may be removed without departing from the scope of the present disclosure. Illustrative, non-exclusive examples of two stack start conditions according to the present disclosure include any of the stack start conditions presented herein.

The stack start conditions and/or stack stop conditions of FIGS. 6 and 7 may include any of the stack start conditions and/or stack stop conditions disclosed herein with reference to FIG. 4, as well as any other suitable trigger and/or event. Supplying electrical output from one or more fuel cell stacks at blocks 958 and 964 may include initiating the production of electrical output from the fuel cell stack(s) and/or transitioning the fuel cell stack(s) from an off or idle state to a running state, as discussed in more detail herein. The methods of FIGS. 6 and 7 may illustrate supplying electrical output from the at least a first energy storage device associated with fuel cell system 20 in place of and/or in addition to supplying the electrical output from the fuel cell stacks. While FIGS. 6 and 7 include two fuel cell stacks, the method may include supplying electrical output from any suitable number of fuel cell stacks without departing from the scope of the present disclosure and as discussed in more detail herein. Thus, it is within the scope of the present disclosure that the methods of FIGS. 6 and/or 7 may be utilized with the methods of FIGS. 4 and/or 5 to control the operation of a plurality of fuel cell stacks and/or a plurality of fuel cell assemblies included within a fuel cell bank.

The systems and method disclosed herein may recite a first fuel cell stack (and/or stack 1), a second fuel cell stack (and/or stack 2), and/or an $N^{th}$ fuel cell stack (and/or stack N). It is within the scope of the present disclosure that the first fuel cell stack may be a specific fuel cell stack and that this fuel cell stack is always the first fuel cell stack to begin the production of electrical output subject to the first stack start condition being satisfied. However, it is also within the scope of the present disclosure that the first, second, and/or $N^{th}$ fuel cell stack may refer to the first, second, and/or $N^{th}$ fuel cell stack to begin the production of electrical output and not to a specific fuel cell stack. This may enable the systems and methods disclosed herein to select a first, second, and/or $N^{th}$ fuel cell stack to transition to the running state based on any suitable criteria. This may include criteria that seek to equalize the usage of the various fuel cell stacks within the fuel cell system and/or criteria that seek to optimize the electrical performance of the fuel cell system such as, for example, in systems in which the nominal electrical output from the fuel cell stacks varies across the N fuel cell stacks within the fuel cell system and a specific fuel cell stack may be selected based at least in part on a comparison of the nominal output from the individual fuel cell stack to the load applied by the energy consuming device.

It is also within the scope of the present disclosure that, subsequent to initiating electrical output from the first fuel cell stack, the method may include waiting for a transitional condition to be met before initiating electrical output from a subsequent fuel cell stack. This transitional condition may include waiting for a threshold time and/or waiting for the first fuel cell stack to reach a threshold voltage level prior to initiating the production of electrical output from a subsequent fuel cell stack. Illustrative, non-exclusive examples of threshold times according to the present disclosure include times of greater than 1 second, including times of greater than 5, 10, 15, 30, 45, 60, 90, 120, 180, 240, 300, and 600 seconds. Illustrative, non-exclusive examples of threshold voltage levels according to the present disclosure include voltage levels that are greater than 50% of the nominal open-circuit voltage of the fuel cell stack, including voltage levels that are greater than 60%, 70%, 75%, 80%, 90%, and 95% of the nominal open-circuit voltage of the fuel cell stack.

More specific but still illustrative, non-exclusive examples of the systems and methods for independently controlling the operation of fuel cell stacks disclosed herein are provided in Tables 1-5. Tables 1 and 2 reference an illustrative, non-exclusive example of a fuel cell system that includes two fuel cell stacks with a nominal net system power output of 5,000 watts. Table 1 relates to an energy storage device that includes a battery with a nominal output voltage of 48 volts, while Table 2 relates to an energy storage device that includes a battery with a nominal output voltage of 24 volts. The given values may be, but are not required to be, utilized with the method flow charts of FIGS. 6 and 7.

TABLE 1

| Example # | $1^{st}$ Stack Start | $2^{nd}$ Stack Start | $1^{st}$ Stack Stop | $2^{nd}$ Stack Stop | Both Stack Stop |
|---|---|---|---|---|---|
| 1 | $V_B < 53$ V | $V_B < 51$ V | $V_B > 54$ V | $V_B > 54$ V | PPS Online |
| 2 | $V_B < 49$ V | $V_B < 48$ V | $V_B > 50$ V | $V_B > 50$ V | PPS Online |
| 3 | $V_B < 49$ V | $V_B < 48$ V | $V_B > 54$ V | $V_B > 54$ V | PPS Online |
| 4 | $V_B < V_1$ for $>T_1$ seconds | $V_B < V_2$ for $>T_2$ seconds | (PG < 1000 watts for >120 seconds) OR PPS Online OR (P1 < 600 watts for >10 seconds) | (PG < 1500 watts for $>T_3$ seconds) OR (P2 < 600 watts for >10 seconds) | PPS Online OR (PN < 100 watts for >10 seconds) |
| 5 | $V_B < 52$ V | $V_B < 51$ V | [(PN < 1000 watts for >30 seconds) AND $V_B > 54$ V] OR PPS Online | PN < 1500 watts for >120 seconds | PPS Online |
| 6 | $V_B < 49$ V | $V_B < 48$ V | [(PN < 1000 watts for >30 seconds) AND $V_B > 53$ V] OR PPS Online | PN < 1500 watts for >120 seconds | PPS Online |
| 7 | $V_B < 49$ V | $V_B < 48$ V | [(PN < 1000 watts for >30 seconds) AND $V_B > 52$ V] OR PPS Online | PN < 1500 watts for >120 seconds | PPS Online |

TABLE 2

| Example # | 1st Stack Start | 2nd Stack Start | 1st Stack Stop | 2nd Stack Stop | Both Stack Stop |
|---|---|---|---|---|---|
| 1 | $V_B < 26.5$ V | $V_B < 25.5$ V | $V_B > 27$ V | $V_B > 27$ V | PPS Online |
| 2 | $V_B < 24.5$ V | $V_B < 24$ V | $V_B > 25$ V | $V_B > 25$ V | PPS Online |
| 3 | $V_B < 24.5$ V | $V_B < 24$ V | $V_B > 27$ V | $V_B > 27$ V | PPS Online |
| 4 | $V_B < V_1$ for $> T_1$ seconds | $V_B < V_2$ for $> T_2$ seconds | (PG < 1000 watts for >120 seconds) OR PPS Online OR (P1 < 600 watts for >10 seconds) | (PG < 1500 watts for $> T_3$ seconds) OR (P2 < 600 watts for >10 seconds) | PPS Online OR (PN < 100 watts for >10 seconds) |
| 5 | $V_B < 26$ V | $V_B < 25.5$ V | [(PN < 1000 watts for >30 seconds) AND $V_B > 27$ V] OR PPS Online | PN < 1500 watts for >120 seconds | PPS Online |
| 6 | $V_B < 24.5$ V | $V_B < 24$ V | [(PN < 1000 watts for >30 seconds) AND $V_B > 26.5$ V] OR PPS Online | PN < 1500 watts for >120 seconds | PPS Online |
| 7 | $V_B < 24.5$ V | $V_B < 24$ V | [(PN < 1000 watts for >30 seconds) AND $V_B > 26$ V] OR PPS Online | PN < 1500 watts for >120 seconds | PPS Online |

In the Tables, "$V_B$" may refer to the voltage of energy storage device 630, "PPS Online" may refer to a condition in which the primary power system is able to supply the electrical load applied by the energy consuming device, PG may refer to the gross power output from the fuel cell stacks, P1 may refer to the gross power output from stack 1, P2 may refer to the gross power output from stack 2, PN may refer to the net power output from the fuel cell system, $T_i$ values may refer to various time thresholds, and $V_i$ values may refer to various voltage thresholds. Illustrative, non-exclusive examples of the thresholds presented above are discussed in more detail herein.

Tables 3-5 assume a fuel cell bank including three fuel cell assemblies, each with a nominal net system power output of 5,000 watts. Table 3 references an energy storage device that includes a battery with a nominal output voltage of 48 volts, while Table 4 references an energy storage device that includes a battery with a nominal output voltage of 24 volts. Table 5 may be utilized with any suitable energy storage device voltage. In Table 5, "load" may refer to any suitable electrical load applied by an energy consuming and/or energy storing device. This may include a load applied to the fuel cell system as a whole, to a fuel cell assembly, to an individual fuel cell stack, and/or to an energy storage device. The given values may (but are not required to) be utilized with the method flow charts of FIGS. 6 and 7 incorporated into the fuel cell bank of FIG. 5.

TABLE 3

| Assembly # | 1st Stack Start | 2nd Stack Start | 1st Stack Stop | 2nd Stack Stop | Both Stack Stop |
|---|---|---|---|---|---|
| 1 | $V_B < 52$ V | $V_B < 51$ V | $V_B > 54$ V | $V_B > 54$ V | PPS Online |
| 2 | $V_B < 49$ V | $V_B < 48$ V | $V_B > 53$ V | $V_B > 53$ V | PPS Online |
| 3 | $V_B < 49$ V | $V_B < 48$ V | $V_B > 52$ V | $V_B > 52$ V | PPS Online |

TABLE 4

| Assembly # | 1st Stack Start | 2nd Stack Start | 1st Stack Stop | 2nd Stack Stop | Both Stack Stop |
|---|---|---|---|---|---|
| 1 | $V_B < 26$ V | $V_B < 25.5$ V | $V_B > 27$ V | $V_B > 27$ V | PPS Online |
| 2 | $V_B < 24.5$ V | $V_B < 24$ V | $V_B > 26.5$ V | $V_B > 26.5$ V | PPS Online |
| 3 | $V_B < 24.5$ V | $V_B < 24$ V | $V_B > 26$ V | $V_B > 26$ V | PPS Online |

TABLE 5

| Assembly # | Two Stack Start | 1st Stack Start | 2nd Stack Start | 1st Stack Stop | 2nd Stack Stop | Both Stack Stop |
|---|---|---|---|---|---|---|
| 1 | PPS Offline AND load >2500 watts | PPS Offline AND load >1000 watts | load >2500 watts | PPS Online OR load <1000 watts | load <1500 watts | PPS Online |
| 2 | PPS Offline AND load >7500 watts | PPS Offline AND load >5000 watts | load >7500 watts | PPS Online OR load <3000 watts | load <4000 watts | PPS Online |
| 3 | PPS Offline AND load >12500 watts | PPS Offline AND load >10000 watts | load >12500 watts | PPS Online OR load <4000 watts | load <6000 watts | PPS Online |

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" may mean A alone, B alone, C alone, A and B together, A and C together, B and C together, A, B and C together, and optionally any of the above in combination with at least one other entity.

In the event that any of the references that are incorporated by reference herein define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

Illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A method of operating a fuel cell system that includes an oxidant source adapted to provide an oxidant stream, a fuel source adapted to provide a fuel stream, an energy storage device adapted to store electrical energy and provide an energy storage device electrical output, and a plurality of fuel cell stacks, wherein the plurality of fuel cell stacks are adapted to receive the fuel stream and the oxidant stream and to produce a stack electrical output therefrom, wherein the fuel cell system is adapted to produce a system electrical output to supply to an energy consuming device, the method comprising:

beginning production of the system electrical output from the fuel cell system responsive to a system start condition;

initiating production of electrical output from a first fuel cell stack of the plurality of fuel cell stacks responsive to a first stack start condition;

initiating production of electrical output from a second fuel cell stack of the plurality of fuel cell stacks responsive to a second stack start condition that is different from the first stack start condition; and ceasing the production of electrical output from at least one of the first and second fuel cell stacks of the plurality of fuel cell stacks responsive to a stack stop condition.

A2. The method of paragraph A1, wherein the fuel cell system is adapted to satisfy an electrical load applied by the energy consuming device.

A3. The method of paragraph A1, wherein the fuel cell system is adapted to satisfy an electrical load applied by the energy consuming device when a primary power system is unavailable to satisfy the load.

A4. The method of any of the preceding paragraphs, wherein the system start condition includes an increase in the electrical power demand from the energy consuming device, and optionally includes detection of an increase in the electrical power demand from the energy consuming device.

A5. The method of any of the preceding paragraphs, wherein the system start condition includes detecting a start signal.

A6. The method of any of the preceding paragraphs, wherein the system start condition includes a user-generated signal, and optionally includes detection of a user-generated signal.

A7. The method of paragraph A3, wherein the system start condition includes detecting a change in the electrical output of the primary power system.

A8. The method of paragraph A7, wherein the change in the electrical output of the primary power system includes a decrease in the electrical output from the primary power system, and optionally includes detection of a decrease in the electrical output from the primary power system.

A9. The method of any of paragraphs A7-A8, wherein the change in the electrical output of the primary power system includes a decrease in the stability of the electrical output from the primary power system, and optionally includes detection of a decrease in the stability of the electrical output from the primary power system.

A10. The method of any of paragraphs A7-A9, wherein the change in the electrical output of the primary power system includes a lack of electrical output from the primary power system, and optionally includes detecting a lack of electrical output from the primary power system.

A11. The method of any of paragraphs A3-A10, wherein the system start condition includes detecting that the primary power system is at least temporarily unable to satisfy the electrical load applied by the energy consuming device.

A12. The method of paragraph A11, wherein detecting that the primary power system is unable to satisfy the electrical load applied by the energy consuming device includes detecting that the energy consuming device is consuming more power than may be supplied by the primary power system.

A13. The method of any of the preceding paragraphs, wherein beginning production of the electrical output includes supplying the electrical output from the energy storage device.

A14. The method of any of the preceding paragraphs, wherein beginning production of the electrical output includes supplying the electrical output from at least one of the plurality of fuel cell stacks.

A15. The method of any of the preceding paragraphs, wherein initiating production of electrical output includes supplying the fuel stream and the oxidant stream to at least one of the plurality of fuel cell stacks and producing the stack electrical output therefrom.

A16. The method of any of the preceding paragraphs, wherein the first stack start condition corresponds to the energy storage device reaching a first level of charge, the second stack start condition corresponds to the energy storage device reaching a second level of charge, and further wherein the first level of charge is greater than, less than, or equal to the second level of charge.

A17. The method of paragraph A16, wherein the first level of charge corresponds to a first potential energy level of the energy storage device, the second level of charge corresponds to a second potential energy level of the energy storage device, and the first potential energy level of the energy storage device is greater than, less than, or equal to the second potential energy level of the energy storage device.

A18. The method of any of paragraphs A16-A17, wherein the first level of charge corresponds to a first voltage of the energy storage device, the second level of charge corresponds to a second voltage of the energy storage device, and the first voltage is greater than, less than, or equal to the second voltage of the energy storage device.

A19. The method of any of the preceding paragraphs, wherein the first stack start condition and/or the second stack start condition include detecting that the primary power system is at least temporarily unable to satisfy the electrical load applied by the energy consuming device.

A20. The method of any of the preceding paragraphs, wherein the first stack start condition and/or the second stack start condition includes detecting that the fuel cell system electrical output is greater than 100 watts, optionally including detecting that the fuel cell system electrical output is greater than 200, 250, 500, 750, 1000, 1250, 1500, 1750, 2000, 2500, 3000, 4000, 5000, 7500, 10,000, and/or 15,000 watts.

A21. The method of any of paragraphs A16-A20, wherein the first stack start condition corresponds to the energy storage device reaching a first level of charge for a first stack start time, the second stack start condition corresponds to the energy storage device reaching a second level of charge for a second stack start time, and further wherein the first level of charge is greater than the second level of charge.

A22. The method of paragraph A21, wherein the first stack start time is between 1 and 1000 seconds and the second stack start time is between 1 and 1000 seconds, optionally including greater than or less than 5, 10, 20, 30, 45, 60, 120, 300, and 600 seconds, and further optionally wherein the first stack start time may be greater than, less than, or equal to the second stack start time.

A23. The method of any of the preceding paragraphs, wherein the system electrical output includes at least one of the stack electrical output and the energy storage device electrical output.

A24. The method of any of the preceding paragraphs, wherein ceasing the production of electrical output includes ceasing the delivery of the fuel stream to at least one of the plurality of fuel cell stacks, and optionally to the first fuel cell stack and the second fuel cell stack of the plurality of fuel cell stacks.

A25. The method of any of the preceding paragraphs, wherein ceasing the production of electrical output includes ceasing the delivery of the oxidant stream to the fuel cell stack.

A26. The method of any of the preceding paragraphs, wherein ceasing the production of electrical output includes electrically disconnecting the stack electrical output from the energy consuming device.

A27. The method of any of the preceding paragraphs, wherein the stack stop condition includes a first stack stop condition and the method includes ceasing the production of electrical output from one of the first fuel cell stack of the plurality of fuel cell stacks and the second fuel cell stack of the plurality of fuel cell stacks responsive to the first stack stop condition, and further wherein the stack stop condition includes a second stack stop condition and the method includes ceasing the production of electrical output from the other of the first fuel cell stack of the plurality of fuel cell stack and the second fuel cell stack of the plurality of fuel cell stacks responsive to the second stack stop condition.

A28. The method of paragraph A27, wherein at least one of the first stack stop condition and the second stack stop condition corresponds to a gross power output from the fuel cell system falling below a predetermined threshold level.

A29. The method of paragraph A28, wherein the gross power output from the fuel cell system corresponds to between 1 and 99% of a nominal gross power output from the fuel cell system, optionally including a nominal gross power output that is greater than or is less than 5, 10, 15, 20, 25, or 50% of the nominal gross power output from the fuel cell system.

A30. The method of any of paragraphs A28-A29, wherein the gross power output from the fuel cell system corresponds to between 1 and 6000 watts, optionally including a gross power output from the fuel cell system that is greater than or less than 100, 200, 300, 400, 500, 600, 700, 800, 900, 1000, 1100, 1200, 1300, 1400, 1500, 2500, 3000, 4000, or 5000 watts.

A31. The method of any of paragraphs A27-A30, wherein at least one of the first stack stop condition and the second stack stop condition corresponds to a gross power output from the first fuel cell stack and/or a gross power output from the second fuel cell stack falling below a predetermined threshold level.

A32. The method of paragraph A31, wherein at least one of the gross power output from the first fuel cell stack and the gross power output from the second fuel cell stack corresponds to between 1 and 99% of a nominal gross power output from the fuel cell stack, optionally including a gross power output from the fuel cell stack that is greater than or less than 5, 10, 15, 20, 25, or 50% of the nominal gross power output from the fuel cell stack.

A33. The method of any of paragraphs A31-A32, wherein at least one of the gross power output from the first fuel cell stack and the gross power output from the second fuel cell stack corresponds to between 1 and 3000 watts, optionally including a gross power output from the fuel cell stack that is greater than or less than 50, 100, 150, 200, 250, 300, 400, 500, 600, 700, 800, or 1000 watts.

A34. The method of any of paragraphs A27-A33, wherein at least one of the first stack stop condition and the second stack stop condition corresponds to a net power output from the fuel cell system falling below a predetermined threshold level.

A35. The method of paragraph A34, wherein the net power output from the fuel cell system corresponds to between 1 and 99% of a nominal net power output from the fuel cell system, including 5, 10, 15, 20, 25, and 50% of the nominal net power output from the fuel cell system.

A36. The method of any of paragraphs A34-A35, wherein the net power output from the fuel cell system corresponds to between 1 and 5000 watts, optionally including a net power output from the fuel cell system that is greater than or less than 50, 100, 150, 200, 300, 400, 500, 1000, or 1500 watts.

A37. The method of any of paragraphs A27-A36, wherein the first stack stop condition includes the first stack stop condition being met for a first stack stop time threshold, and further wherein the first stack stop time threshold is between 1 and 1000 seconds, optionally including a first stack stop time threshold that is greater than or less than 5, 10, 20, 30, 45, 60, 90, 120, or 600 seconds.

A38. The method of any of paragraphs A27-A37, wherein the second stack stop condition includes the second stack stop condition being met for a second stack stop time threshold, optionally including a second stack stop time threshold that is greater than or less than 5, 10, 20, 30, 45, 60, 90, 120, or 600 seconds.

A39. The method of any of the preceding paragraphs, wherein ceasing production of electrical output from at least one of the first fuel cell stack and the second fuel cell stack includes ceasing production of electrical output from both the first fuel cell stack and the second fuel cell stack responsive to an all stack stop condition.

A40. The method of any of the preceding paragraphs, wherein the all stack stop condition corresponds to a float potential energy of the energy storage device.

A41. The method of paragraph A40, wherein the float potential energy of the energy storage device corresponds to a float level of charge of the energy storage device.

A42. The method of paragraph A40, wherein the float potential energy of the energy storage device corresponds to a float voltage of the energy storage device, and optionally wherein the float voltage of the energy storage device corresponds to the fully charged voltage of the energy storage device, further optionally including a float voltage of the energy storage device that is less than or equal to 100% of the fully charged voltage, still further optionally including a float voltage of the energy storage device that is less than 60, 65, 70, 75, 80, 85, 90, 95, 96, 97, 98, or 99% of the fully charged voltage of the energy storage device, or still further optionally wherein the float voltage is less than or equal to 54 volts, optionally including float voltages that are less than 45, 46, 47, 48, 49, 50, 51, 52, or 53 volts.

A43. The method of any of the preceding paragraphs, wherein the all stack stop condition corresponds to the primary power system being available to supply an electrical output to the energy consuming device and optionally to detecting that the primary power system is available to supply an electrical output to the energy consuming device.

A44. The method of any of the preceding paragraphs, wherein the all stack stop condition corresponds to the primary power system being able to meet the electrical load applied by the energy consuming device and optionally to detecting that the primary power system is able to meet the electrical load applied by the energy consuming device.

A45. The method of any of the preceding paragraphs, wherein the all stack stop condition corresponds to a gross power output from the fuel cell stacks falling below a threshold level, and optionally wherein the threshold level is less than 99% of the nominal gross power output from the fuel cell stacks, further optionally including a nominal gross power output from the fuel cell stacks that is less than 5, 10, 15, 20, 25, or 50% of the nominal gross power output from the fuel cell stacks and still further optionally wherein the gross power output from the fuel cell stacks is less than 6000 watts, optionally including a gross power output from the fuel cell stacks that is less than 100, 200, 300, 400, 500, 600, 700, 800, 900, 1000, 1100, 1200, 1300, 1400, 1500, 2000, 3000, 4000, or 5000 watts.

A46. The method of any of the preceding paragraphs, wherein the all stack stop condition corresponds to a gross power output from the fuel cell system falling below a threshold level, and optionally wherein the threshold level is less than 99% of the nominal gross power output from the fuel cell system, further optionally including a gross power output from the fuel cell system that is less than 5, 10, 15, 20, 25, or 50% of the nominal gross power output from the fuel cell system and still further optionally wherein the gross power output from the fuel cell system is less than 6000 watts, optionally including a gross power output from the fuel cell system that is less than 100, 200, 300, 400, 500, 600, 700, 800, 900, 1000, 1100, 1200, 1300, 1400, 1500, 2000, 3000, 4000, or 5000 watts.

A47. The method of any of the preceding paragraphs, wherein the all stack stop condition corresponds to a net power output from the fuel cell system falling below a threshold level, and optionally wherein the threshold level is between 1 and 99% of the nominal net power output from the fuel cell system, further optionally including a net power output from the fuel cell system that is less than 5, 10, 15, 20, or 50% of the nominal net power output from the fuel cell system and still further optionally wherein the net power output from the fuel cell system is less than 5000 watts, optionally including a net power output from the fuel cell system that is less than 50, 100, 150, 200, 300, 400, 500, 1000, 1500, 2000, 3000, or 4000 watts.

A48. The method of any of the preceding paragraphs, wherein the all stack stop condition includes the all stack stop condition being met for an all stack stop time threshold and optionally wherein the all stack stop time threshold is between 1 and 1000 seconds, optionally including all stack stop time thresholds that are greater than or less than 5, 10, 20, 30, 45, 60, 90, 120, or 600 seconds.

A49. The method of any of the preceding paragraphs, wherein the method further includes initiating production of electrical output from a third fuel cell stack responsive to a third stack start condition and ceasing production of electrical output from the third fuel cell stack responsive to a third stack stop condition.

A50. The method of any of the preceding paragraphs, wherein the method further includes initiating production of electrical output from an Nth fuel cell stack responsive to an Nth stack start condition and ceasing production of electrical output from the Nth fuel cell stack responsive to an Nth stack stop condition.

A51. The method of any of the preceding paragraphs, wherein the energy storage device includes at least one of a battery, a capacitor, an ultracapacitor, a supercapacitor, and a flywheel.

A52. The method of any of the preceding paragraphs, wherein the energy storage device includes a plurality of energy storage devices.

A53. The method of any of the preceding paragraphs, wherein, subsequent to initiating production of electrical output from the first fuel cell stack, the method further includes waiting for a threshold wait time prior to initiating production of electrical output from the second fuel cell stack.

A54. The method of any of the preceding paragraphs, wherein the first fuel cell stack includes a first stack output voltage and, subsequent to initiating production of electrical output from the first fuel cell stack, the method further includes waiting for the first stack output voltage to reach a threshold level prior to initiating production of electrical output from the second fuel cell stack.

A55. The method of any of the preceding paragraphs, wherein the first stack start condition corresponds to an energy storage device voltage of 53 volts, the second stack start condition corresponds to an energy storage device voltage of 51 volts, and the stack stop condition corresponds to an energy storage device voltage of 54 volts.

A56. The method of any of the preceding paragraphs, wherein the first stack start condition corresponds to an energy storage device voltage of 49 volts, the second stack start condition corresponds to an energy storage device voltage of 48 volts, and the stack stop condition corresponds to an energy storage device voltage of 50 volts.

A57. The method of any of the preceding paragraphs, wherein the first stack start condition corresponds to an energy storage device voltage of 49 volts, the second stack start condition corresponds to an energy storage device voltage of 48 volts, and the stack stop voltage corresponds to an energy storage device voltage of 54 volts.

A58. The method of any of the preceding paragraphs, wherein the fuel cell system includes a fuel cell system bank that includes a plurality of fuel cell assemblies adapted to be operated in parallel, and further wherein each fuel cell assembly of the plurality of fuel cell assemblies within the fuel cell system bank includes a plurality of fuel cell stacks and may include a separate system start condition, separate stack start conditions, and/or separate stack stop conditions for each of the fuel cell stacks contained therein.

A59. The method of paragraph A58, wherein each of the separate system start conditions may be described by paragraphs A4-A12 and may be scaled by the number of fuel cell assemblies.

A60. The method of any of paragraphs A58-A59, wherein each of the separate stack start conditions may be described by paragraphs A16-A22 and may be scaled by the number of fuel cell assemblies.

A61. The method of any of paragraphs A58-A60, wherein each of the separate stack stop conditions may be described by paragraphs A27-A48 and may be scaled by the number of fuel cell assemblies.

B1. A fuel cell system adapted to produce a system electrical output to supply an energy consuming device, the fuel cell system comprising:
  an oxidant source adapted to supply an oxidant stream;
  a fuel source adapted to supply a fuel stream;
  a plurality of fuel cell stacks, wherein each of the plurality of fuel cell stacks is adapted to receive the fuel stream and the oxidant stream and to produce a stack electrical output therefrom;
  an energy storage device that is adapted to produce an energy storage device electrical output and includes a state of charge;
  optionally, an energy consuming device adapted to receive the electrical output from the fuel cell system; and
  a controller adapted to control the operation of the fuel cell system, wherein the controller is adapted to begin the production of the system electrical output responsive to a system start condition, initiate production of electrical output from a first fuel cell stack responsive to a first stack start condition, initiate production of electrical output from a second fuel cell stack responsive to a second stack start condition, cease production of electrical output from the first fuel cell stack responsive to a first stack stop condition, and/or cease production of electrical output from the second fuel cell stack responsive to a second stack stop condition.

B2. A fuel cell system bank including a plurality of fuel cell systems according to paragraph B1, wherein the fuel cell system bank includes at least a first fuel cell system and at least a second fuel cell system.

B3. The fuel cell system of any of paragraphs B1-B2 configured to implement the methods of any of paragraphs A1-A61.

C1. The use of any of the systems of paragraphs B1-B2 with any of the methods of paragraphs A1-A59.

C2. The use of any of the methods of paragraphs A1-A61 with any of the systems of paragraphs B1-B2.

C3. The use of any of the systems of paragraphs B1-C2 to generate electricity.

C4. The use of any of the methods of paragraphs A1-A61 and C1-C2 to generate electricity.

INDUSTRIAL APPLICABILITY

The systems and methods for independently controlling the operation of fuel cell stacks disclosed herein are applicable to the fuel cell industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of operating a fuel cell system that includes an oxidant source configured to provide an oxidant stream, a fuel source configured to provide a fuel stream, and a plurality of fuel cell stacks, wherein the plurality of fuel cell stacks are configured to receive the fuel stream and the oxidant stream and to produce a stack electrical output therefrom, wherein the fuel cell system is configured to produce a system electrical output to supply to an energy consuming device, the method comprising:

beginning production of the system electrical output from the fuel cell system responsive to a system start condition, wherein the fuel cell system is in electrical communication with an energy storage device that is configured to store electrical energy and provide an energy storage device electrical output, and further wherein beginning production of the electrical output includes supplying the electrical output from the energy storage device;

initiating production of electrical output from a first fuel cell stack of the plurality of fuel cell stacks responsive to a first stack start condition, wherein the first stack start condition corresponds to the energy storage device reaching a first level of charge for a first stack start time; and initiating production of electrical output from a second fuel cell stack of the plurality of fuel cell stacks responsive to a second stack start condition that is different from the first stack start condition, wherein the second stack start condition corresponds to the energy storage device reaching a second level of charge for a second stack start time, and further wherein the first level of charge is greater than the second level of charge.

2. The method of claim 1, wherein the fuel cell system is configured to satisfy an electrical load applied by the energy consuming device when a primary power system is unavailable to satisfy the load, and further wherein the system start condition includes detecting a change in the electrical output of the primary power system.

3. The method of claim 2, wherein the change in the electrical output of the primary power system includes at least one of a decrease in the electrical output from the primary power system, a decrease in the stability of the electrical output from the primary power system, and a lack of electrical output from the primary power system.

4. The method of claim 2, wherein at least one of the system start condition, the first stack start condition, and the second stack start condition includes detecting that the primary power system is at least temporarily unable to satisfy the electrical load applied by the energy consuming device.

5. The method of claim 4, wherein detecting that the primary power system is unable to satisfy the electrical load applied by the energy consuming device includes detecting that the energy consuming device is consuming more power than may be supplied by the primary power system.

6. The method of claim 1, wherein beginning production of the system electrical output includes supplying the electrical output from at least one of the plurality of fuel cell stacks, and further wherein initiating production of electrical output includes supplying the fuel stream and the oxidant stream to at least one of the plurality of fuel cell stacks and producing the stack electrical output therefrom.

7. The method of claim 1, wherein the first stack start time is between 1 and 1000 seconds and the second stack start time is between 1 and 1000 seconds.

8. The method of claim 1, wherein the method further comprises ceasing the production of electrical output from at least one of the first and second fuel cell stacks of the plurality of fuel cell stacks responsive to a stack stop condition.

9. The method of claim 8, wherein ceasing the production of electrical output includes at least one of ceasing the delivery of the fuel stream to at least one of the plurality of fuel cell stacks and electrically disconnecting the stack electrical output from the energy consuming device.

10. The method of claim 8, wherein the stack stop condition includes a first stack stop condition and the method includes ceasing the production of electrical output from one of the first fuel cell stack of the plurality of fuel cell stacks and the second fuel cell stack of the plurality of fuel cell stacks responsive to the first stack stop condition, and further wherein the stack stop condition includes a second stack stop condition and the method includes ceasing the production of electrical output from the other of the first fuel cell stack of the plurality of fuel cell stacks and the second fuel cell stack of the plurality of fuel cell stacks responsive to the second stack stop condition.

11. The method of claim 10, wherein at least one of the first stack stop condition and the second stack stop condition corresponds to a power output from the fuel cell system falling below a predetermined threshold level.

12. The method of claim 10, wherein the first stack stop condition includes the first stack stop condition being met for a first stack stop time threshold that is in the range of 1 and 1000 seconds, and further wherein the second stack stop condition includes the second stack stop condition being met for a second stack stop time threshold that is in the range of 1 and 1000 seconds.

13. The method of claim 8, wherein ceasing production of electrical output from at least one of the first fuel cell stack and the second fuel cell stack includes ceasing production of electrical output from both the first fuel cell stack and the second fuel cell stack responsive to an all stack stop condition.

14. The method of claim 13, wherein the all stack stop condition corresponds to a float level of charge of the energy storage device.

15. The method of claim 1, wherein, subsequent to initiating production of electrical output from the first fuel cell stack, the method further includes waiting for a threshold wait time prior to initiating production of electrical output from the second fuel cell stack.

16. The method of claim 1, wherein the first fuel cell stack includes a first stack output voltage and, subsequent to initiating production of electrical output from the first fuel cell stack, the method further includes waiting for the first stack output voltage to reach a threshold level prior to initiating production of electrical output from the second fuel cell stack.

* * * * *